(12) United States Patent
Ogawa

(10) Patent No.: US 11,708,064 B2
(45) Date of Patent: Jul. 25, 2023

(54) HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 17/502,597

(22) Filed: Oct. 15, 2021

(65) Prior Publication Data

US 2022/0126814 A1 Apr. 28, 2022

(30) Foreign Application Priority Data

Oct. 27, 2020 (JP) ................................. 2020-179459

(51) Int. Cl.
*B60W 20/15* (2016.01)
*B60W 50/08* (2020.01)

(52) U.S. Cl.
CPC .......... *B60W 20/15* (2016.01); *B60W 50/082* (2013.01)

(58) Field of Classification Search
CPC .... B60W 20/15; B60W 20/12; B60W 50/082; B60W 2050/146; B60W 2510/244; B60W 2510/305; B60W 2756/10; B60W 10/08; B60W 10/26; B60W 10/06; B60W 30/182
See application file for complete search history.

(56) References Cited

U.S. PATENT DOCUMENTS

| | | | |
|---|---|---|---|
| 2016/0137184 A1 | 5/2016 | Hokoi et al. | |
| 2017/0072939 A1* | 3/2017 | Ishikawa | B60K 6/445 |
| 2017/0282740 A1* | 10/2017 | Ichikawa | B60W 20/00 |
| 2017/0287234 A1* | 10/2017 | Hashimoto | G01C 21/3605 |
| 2019/0126907 A1* | 5/2019 | Park | B60L 58/13 |
| 2019/0176802 A1* | 6/2019 | Kim | B60W 20/00 |
| 2019/0193750 A1 | 6/2019 | Kim et al. | |
| 2020/0130670 A1* | 4/2020 | Ogawa | G01C 21/3605 |

FOREIGN PATENT DOCUMENTS

| | | |
|---|---|---|
| EP | 3480076 A1 | 5/2019 |
| JP | 2014-151760 A | 8/2014 |
| JP | 2015-157557 A | 9/2015 |
| JP | 2016-097697 A | 5/2016 |

\* cited by examiner

*Primary Examiner* — George C Jin
(74) *Attorney, Agent, or Firm* — Sughrue Mion, PLLC

(57) ABSTRACT

A hybrid vehicle includes a controller configured to control an engine and an electric motor in one of a plurality of control modes. The controller is configured to execute a switching control to switch the control mode in accordance with a traveling plan. The controller is configured to report at least one of first information and second information using a report device, the first information indicating that the switching control is capable of being executed, the second information indicating that the switching control is not executed. The controller is configured to report third information using the report device in a case where the first information is reported by the report device, the third information being relevant to the switching control, and not to report the third information in a case where the second information is reported by the report device.

11 Claims, 8 Drawing Sheets

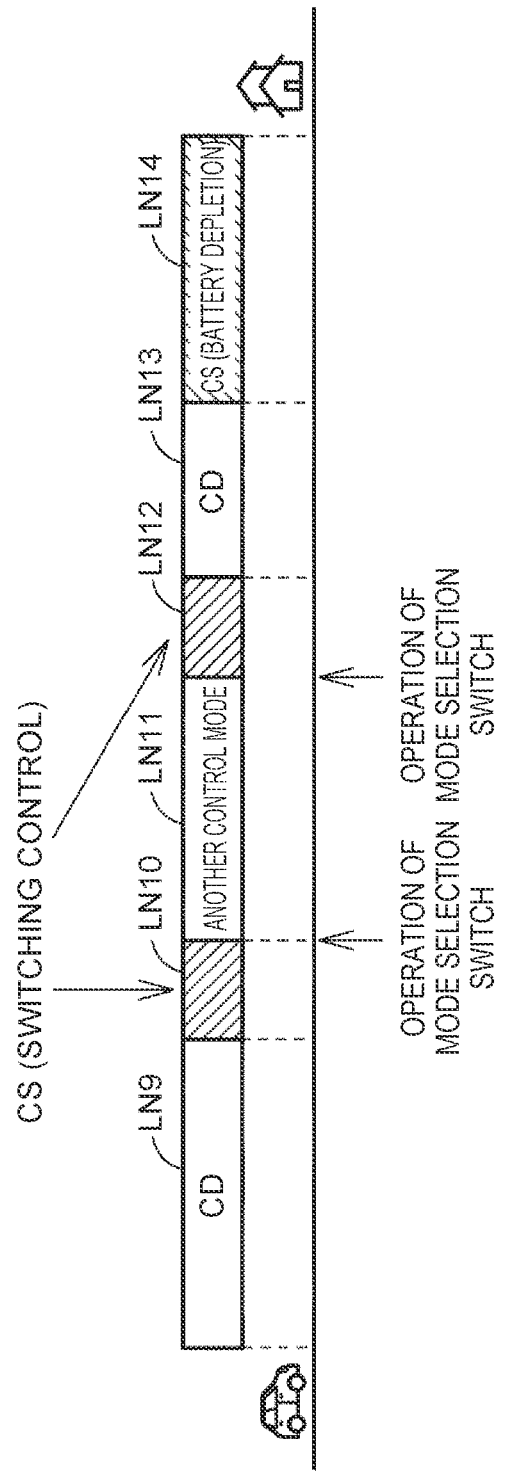

HYBRID VEHICLE

CROSS-REFERENCE TO RELATED APPLICATION

This application claims priority to Japanese Patent Application No. 2020-179459 filed on Oct. 27, 2020, incorporated herein by reference in its entirety.

BACKGROUND

1. Technical Field

The present disclosure relates to a control for a hybrid vehicle.

2. Description of Related Art

In a hybrid vehicle equipped with a motor generator as a drive source and an engine as an electric generation source, one of a plurality of control modes is selected, and the vehicle is controlled in the selected control mode. For example, the plurality of control modes includes a charge depleting (CD) mode in which electric traveling is continued as much as possible while the engine is stopped and the electric power stored in an in-vehicle battery is consumed, and a charge sustaining (CS) mode in which the engine is more easily activated than in the CD mode and the vehicle travels while the remaining amount of the in-vehicle battery is maintained in a fixed range using the engine and the motor generator.

In the case where the hybrid vehicle travels to a destination set by a user, the hybrid vehicle executes a switching control in which the control mode is appropriately switched depending on the situation of a traveling route.

For example, in a technology disclosed in Japanese Unexamined Patent Application Publication No. 2014-151760, a traveling route to a destination is set, and one of an EV mode in which the electric traveling is performed and an HV mode in which the engine and motor generator are used is selected for each of sections that are of a plurality of sections of the set traveling route and that are other than one or more sections just before the destination.

SUMMARY

The hybrid vehicle having the above configuration sometimes reports, to the user, an effect about a change in the traveling distance in the electric traveling using the electric power of the in-vehicle battery in the case where the switching control depending on the traveling situation is executed, compared to the case where the switching control is not executed.

However, for example, when the effect of the switching control is not reported in a situation where the user can obviously recognize that the switching control is executed, or when the effect of the switching control is reported in a situation where the user can obviously recognize that the switching control is not executed, the user can have a strangeness feeling about the report content. As a result, the frequency of use of the switching control depending on the traveling situation can decrease.

The present disclosure provides a hybrid vehicle that reports the content about the switching control depending on the traveling situation such that the content matches with an execution situation that can be recognized by the user.

A hybrid vehicle according to an aspect of the present disclosure includes: an electric motor configured to generate drive force in the hybrid vehicle; an electric storage device configured to supply electric power to the electric motor; an engine configured to generate generated electric power by which the electric storage device is charged; a report device configured to report previously decided information; and a controller configured to control the engine and the electric motor in one of a plurality of control modes. The plurality of control modes includes a charge depleting (CD) mode and a charge sustaining (CS) mode. The controller is configured to execute a switching control to switch the control mode in accordance with a traveling plan in which one of the CD mode and the CS mode is assigned to each of a plurality of sections that constitutes a traveling route to a destination of the hybrid vehicle. The controller is configured to report at least one of first information and second information using the report device, the first information indicating that the switching control is capable of being executed, the second information indicating that the switching control is not executed. The controller is configured to report third information using the report device in a case where the first information is reported by the report device, the third information being relevant to the switching control. The controller is configured not to report the third information in a case where the second information is reported by the report device.

With the hybrid vehicle according to the aspect of the present disclosure, when the first information is reported by the report device, the user can recognize that the switching control is capable of being executed. Further, when the second information is reported by the report device, the user can recognize that the switching control is not executed. Therefore, in the case where the first information is reported, the third information relevant to the switching control is reported using the report device, and in the case where the second information is reported, the third information is not reported. Thereby, it is possible to avoid a report having a content about which the user has a strangeness feeling.

In the hybrid vehicle according to the aspect of the present disclosure, the controller may be configured not to report the third information in a case where the first information and the second information are reported by the report device.

With the hybrid vehicle according to the aspect of the present disclosure, when the second information is reported by the report device, the user can recognize that the switching control is not executed. Therefore, the third information is not reported. Thereby, it is possible to avoid the report having a content about which the user has a strangeness feeling.

In the hybrid vehicle according to the aspect of the present disclosure, the third information may include fourth information, fifth information and sixth information, the fourth information being relevant to an effect of execution of the switching control, the fifth information being relevant to an execution situation of the switching control, the sixth information being relevant to a prompt of use of the switching control. The controller may be configured to report one of the fourth information, the fifth information and the sixth information using the report device, when a stop condition for stopping the switching control is satisfied during execution of the switching control, in a case where the first information is reported by the report device and where the switching control is executed.

With the hybrid vehicle according to the aspect of the present disclosure, when the first information is reported by the report device and the stop condition for stopping the switching control is satisfied during the execution of the switching control, one of the fourth information, the fifth information and the sixth information is reported as the third information, using the report device, and in the case where the second information is reported, the third information is not reported. Therefore, it is possible to avoid the report having a content about which the user has a strangeness feeling.

In the hybrid vehicle according to the aspect of the present disclosure, the third information may include fourth information, fifth information and sixth information, the fourth information being relevant to an effect of execution of the switching control, the fifth information being relevant to an execution situation of the switching control, the sixth information being relevant to a prompt of use of the switching control. The controller may be configured to report the sixth information using the report device, in a case where the first information is reported by the report device and where the switching control is not executed.

With the hybrid vehicle according to the aspect of the present disclosure, in the case where the first information is reported and where the switching control is not executed, the sixth information relevant to the prompt of the use of the switching control is reported as the third information. Therefore, it is possible to avoid the report having a content about which the user has a strangeness feeling, and to prompt the user to execute the switching control.

In the hybrid vehicle according to the aspect of the present disclosure, the controller may be configured to delete information that is relevant to an effect of execution of the switching control and that is information before a stop condition for stopping the switching control is satisfied, in a case where the stop condition is satisfied during execution of the switching control.

With the hybrid vehicle according to the aspect of the present disclosure, when the stop condition for stopping the switching control is satisfied and the switching control is stopped, information relevant to the execution of the switching control sometimes becomes incorrect depending on the driving situation of the hybrid vehicle after that. Therefore, by deleting the information, it is possible to avoid the incorrect information from being reported to the user.

In the hybrid vehicle according to the aspect of the present disclosure, the controller may be configured to report information relevant to an effect of execution of the switching control, using the report device, when the information relevant to the effect of the execution of the switching control is generated, and report one of information relevant to an execution situation of the switching control and information relevant to a prompt of use of the switching control, using the report device, when the information relevant to the effect of the execution of the switching control is not generated, in a case where the switching control is executed again after the information that is relevant to the effect of the execution of the switching control and that is the information before the stop condition is satisfied is deleted.

With the hybrid vehicle according to the aspect of the present disclosure, when the information relevant to the effect of the execution of the switching control is generated after the switching control is executed again, the generated information is reported. Thereby, it is possible to report the effect of the execution of the switching control, to the user. On the other hand, when the information relevant to the effect of the execution of the switching control is not generated, one of the information relevant to the execution situation of the switching control and the information relevant to the prompt of the use of the switching control is reported. Thereby, it is possible to avoid the report having a content about which the user has a strangeness feeling.

In the hybrid vehicle according to the aspect of the present disclosure, the first information may include at least one of information indicating that a control mode in which the switching control is executed has been selected, information indicating that a guidance for traveling to the destination is being executed, and information indicating that the hybrid vehicle is traveling on the traveling route.

With the hybrid vehicle according to the aspect of the present disclosure, by reporting at least one of the information indicating that the control mode in which the switching control is executed has been selected, the information indicating that the guidance for the traveling to the destination is being executed, and the information indicating that the vehicle is traveling on the traveling route, a driver can recognize that the switching control is capable of being executed.

In the hybrid vehicle according to the aspect of the present disclosure, the second information may include at least one of information indicating that a remaining capacity of the electric storage device is lower than a first threshold, information indicating that a full-charge capacity of the electric storage device is lower than a second threshold, information indicating that the electric storage device is in an abnormal state, and information indicating that a control mode in which the switching control is not executed has been selected.

With the hybrid vehicle according to the aspect of the present disclosure, by reporting at least one of the information indicating that the remaining capacity of the electric storage device is lower than the first threshold, the information indicating that the full-charge capacity of the electric storage device is lower than the second threshold, the information indicating that the electric storage device is in the abnormal state, and the information indicating that the control mode in which the switching control is not executed has been selected, the driver can recognize that the switching control is not executed.

The hybrid vehicle according to the aspect of the present disclosure may further include a communication device configured to communicate with an external terminal. The controller may be configured not to report the third information, in a case of satisfaction of at least one of a condition that there is an abnormality in communication between the communication device and the external terminal, a condition that stop of execution of the switching control has been requested, a condition that a guidance for traveling to the destination has been cancelled, a condition that the destination has been deleted.

With the hybrid vehicle according to the aspect of the present disclosure, in the case where there is an abnormality in the communication with the external terminal, in the case where the stop of the execution of the switching control has been requested, in the case where the guidance for the traveling to the destination has been cancelled, or in the case where the destination has been deleted, the third information is not reported. Thereby, it is possible to avoid the report having a content about which the user has a strangeness feeling.

The hybrid vehicle according to the aspect of the present disclosure may further include a communication device configured to communicate with an external portable terminal. The controller may be configured to send the third information to the external portable terminal using the communication device, in addition to reporting the third information using the report device.

With the hybrid vehicle according to the aspect of the present disclosure, in the case where the first information is reported, the third information is sent to the portable terminal in addition to the report device, and in the case where the second information is reported, the third information is not reported. Thereby, it is possible to avoid the report having a content about which the user has a strangeness feeling.

The hybrid vehicle according to the aspect of the present disclosure may further include a communication device configured to communicate with a portable terminal through an external server. The controller may be configured to send the third information to the portable terminal using the communication device, in addition to reporting the third information using the report device.

With the hybrid vehicle according to the aspect of the present disclosure, in the case where the first information is reported, the third information is sent to the portable terminal through the server, in addition to the report device, and in the case where the second information is reported, the third information is not reported. Therefore, it is possible to avoid the report having a content about which the user has a strangeness feeling.

With the present disclosure, it is possible to provide a hybrid vehicle that reports the content about the switching control depending on the traveling situation such that the content matches with an execution situation that can be recognized by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 shows an exemplary traveling pattern in the case where a control mode other than a CD mode is temporarily selected during execution of a switching control in accordance with the traveling plan.

DETAILED DESCRIPTION OF EMBODIMENTS

Figure 1:
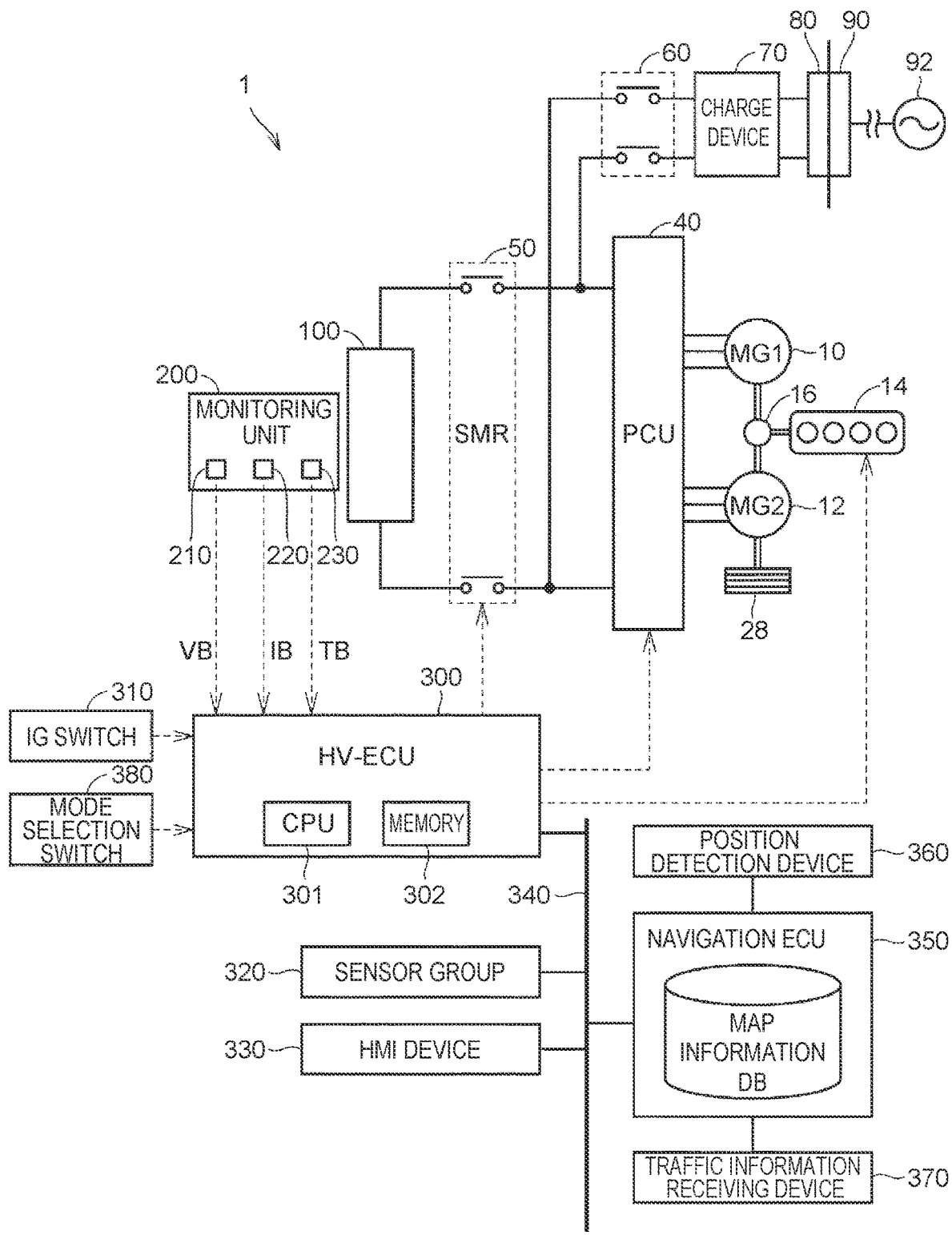
FIG. 1 is a diagram showing an exemplary configuration of a hybrid vehicle.

An embodiment of the present disclosure will be described below in detail with reference to the drawings. In the drawings, identical or corresponding parts are denoted by identical reference characters, and descriptions therefor are not repeated.

An exemplary configuration of a hybrid vehicle according to the embodiment of the present disclosure will be described below. FIG. 1 is a diagram showing an exemplary configuration of a hybrid vehicle 1 (referred to as a vehicle 1, hereinafter). Descriptions will be made assuming that the vehicle 1 is a series-parallel type hybrid vehicle, for example.

As shown in FIG. 1, the vehicle 1 includes a first motor generator 10, a second motor generator 12, an engine 14, a power split device 16, a drive wheel 28, a power control unit (PCU) 40, a system main relay (SMR) 50, a charge relay 60, a charge device 70, an inlet 80, an electric storage device 100, a monitoring unit 200, an HV electronic control unit (HV-ECU) 300, an IG switch 310, a sensor group 320, a human machine interface (HMI) device 330, a navigation ECU 350, a position detection device 360, a traffic information receiving device 370, and a mode selection switch 380. Hereinafter, the first motor generator 10 is referred to as the first MG 10, and the second motor generator 12 is referred to as the second MG 12.

Each of the first MG 10 and the second MG 12 is a three-phase alternating-current rotating electric machine, and for example, is a permanent magnet type synchronous electric motor including a rotor in which a permanent magnet is buried. Each of the first MG 10 and the second MG 12 has a function as an electric motor (motor) and a function as an electric generator (generator). The first MG 10 and the second MG 12 are connected with the electric storage device 100 through the PCU 40.

For example, at the time of start of the engine 14, the first MG 10 is driven by an inverter included in the PCU 40, and rotates an output shaft of the engine 14. Further, at the time of electric power generation, the first MG 10 receives dynamic power of the engine 14, and generates electric power. The electric power generated by the first MG 10 is stored in the electric storage device 100 through the PCU 40.

For example, at the time of traveling of the vehicle 1, the second MG 12 is driven by an inverter included in the PCU 40. Dynamic power of the second MG 12 is transmitted to the drive wheel 28 through a dynamic power transmission gear (not illustrated) such as a differential gear and a reduction gear. Further, for example, at the time of braking of the vehicle 1, the second MG 12 is driven by the drive wheel 28, and the second MG 12 behaves as an electric generator, to perform regenerative braking. The electric power generated by the second MG 12 is stored in the electric storage device 100 through the PCU 40.

The engine 14 is a known internal combustion engine that combusts fuel (gasoline or light oil) to output dynamic power, and for example, is a gasoline engine or a diesel engine. The engine 14 is configured such that operating states such as a throttle opening degree (intake amount), a fuel supply amount and an ignition timing can be electrically controlled by the HV-ECU 300. The HV-ECU 300 controls the fuel injection amount, ignition timing, intake air amount and others of the engine 14, such that the engine 14 behaves at a target speed and target torque that are set based on the state of the vehicle 1.

The power split device 16 splits the dynamic power of the engine 14 to a path to the drive wheel 28 and a path to the first MG 10. For example, the power split device 16 is constituted by a planetary gear mechanism that includes a sun gear, a ring gear, a pinion gear and a carrier.

The PCU 40 is an electric power conversion device that performs electric power conversion between the electric storage device 100 and the first MG 10, or performs electric power conversion between the electric storage device 100 and the second MG 12, in accordance with a control signal from the HV-ECU 300. The PCU 40 is configured to include an inverter (not illustrated) that converts direct-current power from the electric storage device 100 to alternating-current power and drives the first MG 10 or the second MG 12, a converter (not illustrated) that adjusts the voltage level of direct-current power that is supplied from the electric storage device 100 to the inverter, and others.

The SMR 50 is electrically connected between the electric storage device 100 and the PCU 40. The opening or closing of the SMR 50 is controlled in accordance with a control signal from the HV-ECU 300.

The electric storage device 100 is a rechargeable direct-current power source, and for example, is a secondary battery such as a nickel-hydrogen battery and a lithium-ion battery containing a solid or liquid electrolyte. As the electric storage device 100, a capacitor such as an electric double layer capacitor can be also employed. The electric storage device 100 supplies electric power for generating traveling drive force of the vehicle 1, to the PCU 40. Further, the electric storage device 100 is charged by the electric power generated by an electric generation behavior using the first MG 10 and the engine 14, is charged by the electric power generated by the regenerative braking of the second MG 12, or is discharged by a drive behavior of the first MG 10 or the second MG 12.

The monitoring unit 200 monitors the state of the electric storage device 100. For example, the monitoring unit 200 includes a voltage detection unit 210, a current detection unit 220 and a temperature detection unit 230. The voltage detection unit 210 detects a voltage VB between terminals of the electric storage device 100. The current detection unit 220 detects an electric current 1B that is received or output by the electric storage device 100. The temperature detection unit 230 detects a temperature TB of the electric storage device 100. The detection units output the respective detection results to the HV-ECU 300.

The charge relay 60 is electrically connected between the SMR 50 and the charge device 70. The opening or closing of the charge relay 60 is controlled in accordance with a control signal from the HV-ECU 300.

The charge device 70 is electrically connected between the charge relay 60 and the inlet 80. For example, the charge device 70 is an AC-DC converter (inverter). The charge device 70 converts alternating-current power supplied from an external power source 92 through a connector 90 described later and the inlet 80, into direct-current power, and outputs the direct-current power to the charge relay 60. The charge device 70 is controlled by a control signal from the HV-ECU 300.

The charge device 70 is not particularly limited to a device that performs the AC-DC conversion behavior, and in the case where direct-current power is supplied from the inlet 80 to the charge device 70, the charge device 70 may be configured to behave as a DC-DC converter.

The inlet 80 is configured such that the connector 90 can be inserted into the inlet 80 with mechanical coupling such as fitting. By the insertion of the connector 90 into the inlet 80, the vehicle 1 and the external power source 92 are electrically connected. At this time, when the charge relay 60 is in the closing state, the electric power of the external power source 92 can be supplied to the electric storage device 100 through the charge device 70 and the charge relay 60. Hereinafter, the charge of the electric storage device 100 using the electric power of the external power source 92 is referred to as a plug-in charge.

The HV-ECU 300 includes a central processing unit (CPU) 301, and a memory (for example, a read only memory (ROM), a random access memory (RAM) or the like) 302. The HV-ECU 300 controls devices (the engine 14, the PCU 40, the SMR 50, the charge relay 60, the charge device 70, the HMI device 330 and others) in the vehicle 1, such that the vehicle 1 is in a desired state, based on information such as signals that are received from the monitoring unit 200, the IG switch 310, the sensor group 320 and the mode selection switch 380, and maps and programs that are stored in the memory 302. Various controls that are executed by the HV-ECU 300 are not limited to processes by software, and may be processed by dedicated hardware (electronic circuit). The HV-ECU 300 is an example of the controller.

For example, during the driving of the vehicle 1, the HV-ECU 300 calculates a state-of-charge (SOC) indicating the remaining capacity of the electric storage device 100, using the detection results of the monitoring unit 200. The SOC indicates the rate of the current electric storage amount of the electric storage device 100 to the electric storage amount in the full-charge state, in percentage. As a calculation method for the SOC, for example, various known techniques such as a technique by current value integration (coulomb count) or a technique by estimation of open circuit voltage (OCV) can be employed.

The HV-ECU 300 is connected with the sensor group 320, the HMI device 330 and the navigation ECU 350, through a communication bus 340. The navigation ECU 350 is connected with the position detection device 360 and the traffic information receiving device 370.

For example, the sensor group 320 includes an accelerator pedal sensor, a vehicle speed sensor, and a brake pedal sensor. The accelerator pedal sensor detects the accelerator pedal operation amount by a user. The vehicle speed sensor detects the vehicle speed of the vehicle 1. The brake pedal sensor detects the brake pedal operation amount by the user. The sensors output the respective detection results to the HV-ECU 300.

The HMI device 330 is a device that provides information for assisting the driving of the vehicle 1, to the user. For example, the HMI device 330 includes a touch panel display provided in a cabin of the vehicle 1, and includes a speaker and others. The HMI device 330 provides (reports) a variety of information to the user by outputting visual information (graphic information and character information), audio information (voice information and sound information), and others. The HMI device 330 is an example of the report device.

The HMI device 330, which functions as a display, receives the current position of the vehicle 1 and map information and congestion information about a periphery of the current position from the navigation ECU 350 through the communication bus 340, and displays the current position of the vehicle 1 and the map information and congestion information about the periphery.

Further, the HMI device 330 functions as a touch panel that can be operated by the user. By touching the touch panel, the user can alter the scale of a displayed map, or can input the destination of the vehicle 1. When the destination is input to the HMI device 330, information about the destination is sent to the navigation ECU 350 through the communication bus 340.

The devices connected with the communication bus 340 may be configured to be capable of communicating with each other through the communication bus 340 by controller area network (CAN) communication, or may be configured to be capable of communicating with each other by wireless communication, instead of or in addition to the communication bus 340.

The navigation ECU 350 includes a CPU and a memory, which are not illustrated. In the memory, a map information database (DB) is constructed. The navigation ECU 350 outputs the current position of the vehicle 1, the map information and congestion information about the periphery of the current position, and others, to the HMI device 330 and the HV-ECU 300, based on a variety of information stored in the map information DB, a variety of information detected by the position detection device 360, and a variety of information received from the traffic information receiving device 370.

Furthermore, the navigation ECU 350 outputs map information and road traffic information about a traveling route from the current position of the vehicle 1 to the destination, to the HV-ECU 300, at predetermined timings, for example, at intervals of several tens of seconds. Hereinafter, the map information and road traffic information about the traveling route from the current position of the vehicle 1 to the destination are collectively referred to as "look-ahead information".

In the map information DB, map information is stored. The map information includes data relevant to a "node" indicating an intersection, a dead end or the like, a "link" connecting nodes, and a facility (a building, a parking place or the like) along the link. Further, the map information includes position information about each node, distance information about each link, road category information (information such as urban district, expressway and general road) included in each link, grade information about each link, and others. The map information is not limited to information that is read and acquired from the map information DB, and may include information that is successively acquired by communication with an external database in addition to or instead of information to be acquired from the map information DB.

For example, the position detection device 360 acquires the current position of the vehicle 1 based on signals (electric waves) from global positioning system (GPS) satellites, and outputs a signal indicating the current position of the vehicle 1, to the navigation ECU 350. The method for acquiring the current position of the vehicle 1 may be a method of acquiring the current position using satellites or the like that can detect the position and that are other than GPS satellites, or may be a method of acquiring the current position by exchanging predetermined information with an access point for a portable base station or a wireless local area network (LAN).

The traffic information receiving device 370 receives predetermined road traffic information. For example, the predetermined road traffic information includes road traffic information that is provided by an FM multiplex broadcast or the like, and road traffic information that is collected from a probe vehicle or a probe center. The road traffic information includes at least congestion information, and in addition, can include road regulation information, parking information and the like. For example, the road traffic information is updated every few minutes.

The mode selection switch 380 is configured such that one control mode can be selected from a plurality of control modes. The plurality of control modes will be described later. When the mode selection switch 380 accepts an operation from the user, the mode selection switch 380 sends a signal indicating that the mode selection switch 380 has been operated, to the HV-ECU 300.

In the embodiment, the vehicle 1 is controlled by the HV-ECU 300, in one of the plurality of control modes. The plurality of control modes includes a charge depleting (CD) mode and a charge sustaining (CS) mode. In the CD mode, the electric traveling of the vehicle 1 is continued as much as possible, using the discharge electric power of the electric storage device 100, while the engine 14 is stopped, and the electric power stored in the electric storage device 100 is consumed. In the CS mode, the engine 14 is more easily activated than in the CD mode, and the vehicle 1 travels while the remaining amount (SOC) of the electric storage device 100 is maintained in a fixed range, by charging and discharging the electric storage device 100 using the engine 14, the first MG 10 and the second MG 12.

For example, in the case where one of the CD mode and the CS mode is set as the control mode, the HV-ECU 300 controls the engine 14, the first MG 10 and the second MG 12, depending on the set control mode.

For example, in the case where the traveling route is not set (that is, in the case where the destination is not set), the HV-ECU 300 controls the engine 14, the first MG 10 and the second MG 12 in the CD mode, until the SOC of the electric storage device 100 falls below a predetermined value. That is, the HV-ECU 300 performs the electric traveling using the second MG 12, while the engine 14 is stopped. For example, in the case where the drive force requested to the vehicle 1 is increased, for example, due to the increase in the stepping amount of the accelerator pedal, the HV-ECU 300 starts the engine 14 using the first MG 10, and causes the vehicle 1 to travel using the engine 14 and the second MG 12, even when the CD mode has been selected.

When the SOC of the electric storage device 100 falls below the predetermined value, the HV-ECU 300 switches the control mode from the CD mode to the CS mode, and controls the engine 14, the first MG 10 and the second MG 12 in the CS mode. That is, the HV-ECU 300 causes the first MG 10 to generate electric power using the dynamic power of the engine 14, such that the SOC of the electric storage device 100 falls within a predetermined range on the basis of the SOC of the electric storage device 100 at the time of the switching of the control mode, and causes the vehicle 1 to travel using the second MG 12. For example, in the case where the SOC of the electric storage device 100 exceeds the predetermined range, the HV-ECU 300 sometimes stops the engine 14 to perform the electric traveling using the second MG 12, even when the CS mode has been selected.

For example, when an operation for requesting the CS mode is performed to the mode selection switch 380, the HV-ECU 300 sets the CS mode as the control mode. Furthermore, when an operation for requesting the CD mode is performed to the mode selection switch 380, the HV-ECU 300 sets the CD mode as the control mode, on the condition that the SOC of the electric storage device 100 is equal to or higher than a predetermined value. Further, in the case where the SOC of the electric storage device 100 falls below the predetermined value, the HV-ECU 300 switches the control mode from the CD mode to the CS mode, even when the CD mode has been selected by the operation of the mode selection switch 380. Hereinafter, the predetermined value of the SOC for the switching from the CD mode to the CS mode is also referred to as a switching threshold.

In the embodiment, the control mode includes other control modes, in addition to the CD mode and CS mode. Examples of the other control modes include a mode in which the actuation of the engine 14 is prohibited. One of the plurality of control modes can be selected by the operation of the mode selection switch 380.

In the case where the traveling route is set (in the case where the destination is set), the HV-ECU 300 executes a traveling assist control to switch the control mode between the CD mode and the CS mode in accordance with a traveling plan. Hereinafter, the traveling assist control is also referred to as a switching control.

Specifically, when the destination is set, the HV-ECU 300 sets the traveling route from the current position of the vehicle 1 to the destination. For example, the HV-ECU 300 sets a traveling route corresponding to a condition about traveling distance, a condition of whether an expressway is used, a condition of whether congestion occurs, and other conditions. When the traveling route is set, the HV-ECU 300 sets the traveling plan by dividing the traveling route from the current position of the vehicle 1 to the destination into a plurality of traveling sections and assigning one of the CD mode and the CS mode for each of the plurality of traveling sections. In the embodiment, for example, the HV-ECU 300 divides the traveling route into a plurality of traveling sections, by adopting the above-described node on the traveling route as an end of the traveling section, and adopting the above-described link as the traveling section.

The HV-ECU 300 acquires the look-ahead information updated by the navigation ECU 350, and calculates a consumption energy En for each of the plurality of traveling sections constituting the traveling route, based on the acquired look-ahead information. The HV-ECU 300 calculates the consumption energy En for each of the plurality of traveling sections, using the grade information, the road category information, information relevant to a vehicle speed such as a limiting speed, information of whether congestion occurs, the traveling distance, or the like, which are included in the look-ahead information. The HV-ECU 300 may calculate the consumption energy En, for example, using a vehicle weight based on the number of occupants of the vehicle 1, in addition to the look-ahead information. For example, the consumption energy En indicates an energy that is necessary for the vehicle 1 to travel over the whole of the corresponding traveling section at a vehicle speed equivalent to the limiting speed or at a vehicle speed equivalent to the speed at the time of congestion.

For example, the HV-ECU 300 assigns one of the CD mode and the CS mode for each of the plurality of traveling sections, such that the SOC of the electric storage device 100 falls within a predetermined range at the time when the vehicle 1 arrives at the destination. For example, the predetermined range is a range of the SOC that allows a determination that all of the electric power of the electric storage device 100 has been used. For example, the upper limit of the predetermined range may be the threshold of the SOC for the switching from the CD mode to the CS mode, may be a previously decided value that is higher than the threshold, or may be a previously decided value that is lower than the threshold. For example, the lower limit of the predetermined range is a previously decided value that is set to such a value that the deterioration of the electric storage device 100 is not accelerated.

For example, in the case where a total Esum of the consumption energies En for the respective traveling sections is smaller than an energy Er equivalent to an electric power amount that is consumed until the SOC of the electric storage device 100 is changed from the current value to a value in the predetermined range, the HV-ECU 300 assigns the CD mode to each of the plurality of traveling sections. Hereinafter, the total of the consumption energies En for the respective traveling sections is referred to as the total consumption energy Esum, and an energy equivalent to an electric power amount that is consumed until the SOC of the electric storage device 100 is changed from the current value to a value in the predetermined range is referred to as a remaining energy Er. The threshold indicates a value in a predetermined range of the SOC that is predicted as the SOC when the vehicle 1 arrives at the destination.

On the other hand, in the case where the total consumption energy Esum is larger than the remaining energy Er, the HV-ECU 300 preferentially assigns the CD mode to at least one of the plurality of traveling sections, and assigns the CS mode to the traveling sections to which the CD mode is not assigned.

For example, the HV-ECU 300 specifies traveling sections to which the CD mode is preferentially assigned, from the plurality of traveling sections, as CD mode preference sections, and assigns the CD mode to the specified traveling sections. For example, the CD mode preference section includes a traveling section where it is desirable to relatively reduce traveling sound, as exemplified by an urban district, a residential district or a minor street. Information indicating that the traveling section is an urban district, a residential district or a minor street is previously stored in the map information DB.

After the HV-ECU 300 assigns the CD mode to the CD mode preference sections, the HV-ECU 300 assigns the CD mode to other traveling sections in ascending order of the consumption energy En, and integrates the consumption energies in the traveling sections to which the CD mode is assigned. The HV-ECU 300 assigns the CD mode to traveling sections, until the value resulting from adding the total of the consumption energies in the traveling sections corresponding to the CD mode preference sections and the integrated consumption energies, that is, the total of the consumption energies in the CD mode exceeds the remaining energy Er. The HV-ECU 300 stops assigning the CD mode at the time when the total of the consumption energies in the CD mode exceeds the remaining energy Er, and assigns the CS mode to the traveling sections to which the CD mode is not assigned.

By assigning the control mode to each of the plurality of traveling sections in this way, it is possible to keep the SOC of the electric storage device 100 within the predetermined range at the time when the vehicle 1 arrives at the destination. After the traveling plan is set, the HV-ECU 300 executes the switching control to switch the control mode in accordance with the set traveling plan. Therefore, after the start of the driving of the vehicle 1, when the vehicle 1 passes through the node on the traveling route, the HV-ECU 300 switches the switching mode to a control mode set for a traveling section after passing through the node.

The vehicle 1 having the above-described configuration sometimes reports, to the user, how the traveling distance in the electric traveling using the electric power of the electric storage device 100 as the in-vehicle battery in the case of executing the switching control to appropriately switch the control mode depending on the traveling plan changes, compared to the case of not executing the switching control depending on the traveling plan.

Figure 2:
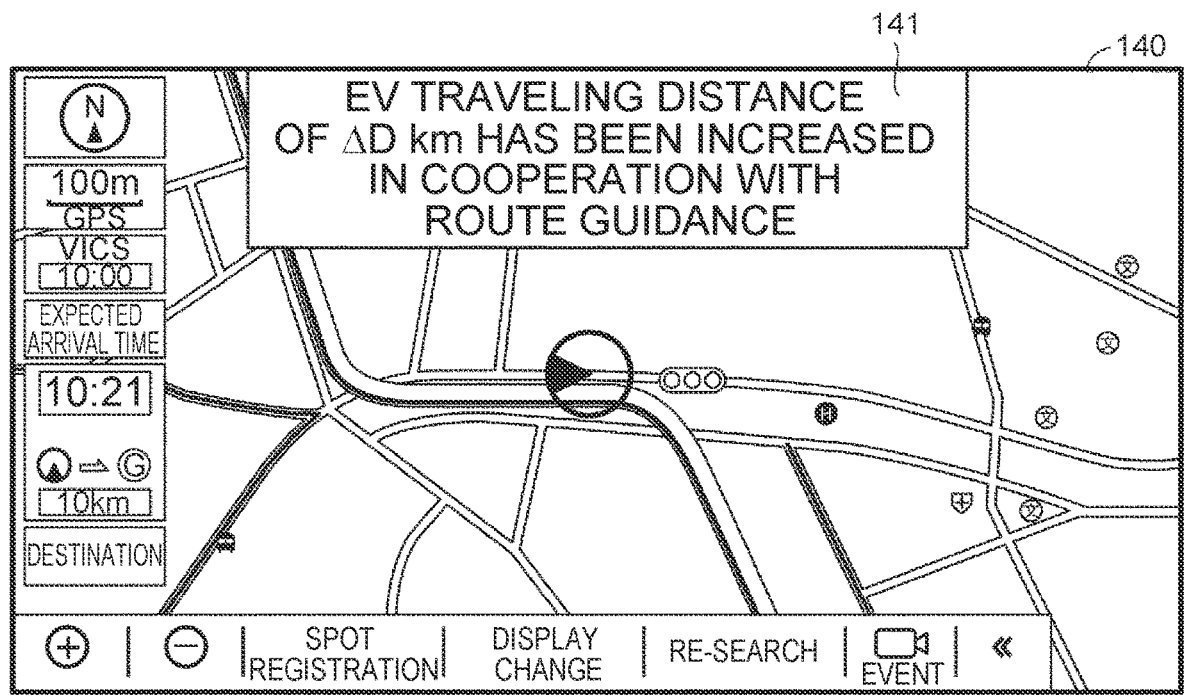
FIG. 2 is a diagram showing an exemplary display in the case of reporting, to a user, an effect of execution of a control to appropriately switch a control mode depending on a traveling plan.

FIG. 2 is a diagram showing an exemplary display in the case of reporting, to the user, an effect of the execution of the control to appropriately switch the control mode depending on the traveling plan.

For example, in response to a request from the HV-ECU 300, the navigation ECU 350 displays, on the display of the HMI device 330, information indicating how much the traveling distance in the electric traveling using the electric power of the electric storage device 100 has been increased, as the effect of the execution of the control to appropriately switch the control mode depending on the traveling plan, when the vehicle 1 travels or when the vehicle 1 arrives at the destination. For example, in FIG. 2, character information indicating that the traveling distance in the electric traveling using the electric power of the electric storage device 100 has been increased by ΔD km, by the cooperation of the control mode with route guidance, that is, by the execution of the control to appropriately switch the control mode depending on the traveling plan is shown on a navigation screen. Since, the character information is displayed on the HMI device 330, the user can recognize the effect of the execution of the switching control to appropriately switch the control mode depending on the traveling plan.

However, for example, when the effect of the execution of the switching control is not reported in a situation where the user can obviously recognize that the switching control is executed, or when the effect of the switching control is reported in a situation where the user can obviously recognize that the switching control is not executed, the user can have a strangeness feeling about the report content. As a result, the frequency of use of the switching control depending on the traveling situation can decrease.

Hence, in the embodiment, the HV-ECU 300 behaves as follows. That is, using the HMI device 330, the HV-ECU 300 repots at least one of information that can be visually recognized by the user and that indicates that the switching control is capable of being executed and information that can be visually recognized by the user and that indicates that the switching control is not executed. Hereinafter, the information that can be visually recognized by the user and that indicates that the switching control is capable of being executed is referred to as first information, and the information that can be visually recognized by the user and that indicates that the switching control is not executed is referred to as second information. In the case where the first information is reported by the HMI device 330, the HV-ECU 300 reports information relevant to the switching control, using the HMI device 330, and in the case where the second information is reported by the HMI device 330, the HV-ECU 300 does not report the information relevant to the switching control. Hereinafter, the information relevant to the switching control is referred to as third information.

For example, the first information includes at least one of information indicating that a control mode in which the switching control is executed has been selected, information indicating that a guidance for traveling to the destination of the vehicle 1 is being executed, and information indicating that the vehicle 1 is traveling on the traveling route.

For example, the second information includes at least one of information indicating that the SOC of the electric storage device 100 is lower than a threshold for determining a depletion state, information indicating that the full-charge capacity of the electric storage device 100 is lower than a threshold for determining a deterioration state, information indicating that the electric storage device 100 is in an abnormal state, and information indicating that a control mode in which the switching control is not executed has been selected.

For example, the third information includes at least one of information relevant to the effect of the execution of the switching control, information relevant to an execution situation of the switching control and information relevant to a prompt of the use of the switching control.

When the first information is reported by the HMI device 330, the user can recognize that the switching control is capable of being executed. Further, when the second information is reported by the HMI device 330, the user can recognize that the switching control is not executed. Therefore, in the case where the first information is reported, the third information is reported using the HMI device 330, and in the case where the second information is reported, the third information is not reported. Thereby, it is possible to avoid a report having a content about which the user has a strangeness feeling.

Figure 3:
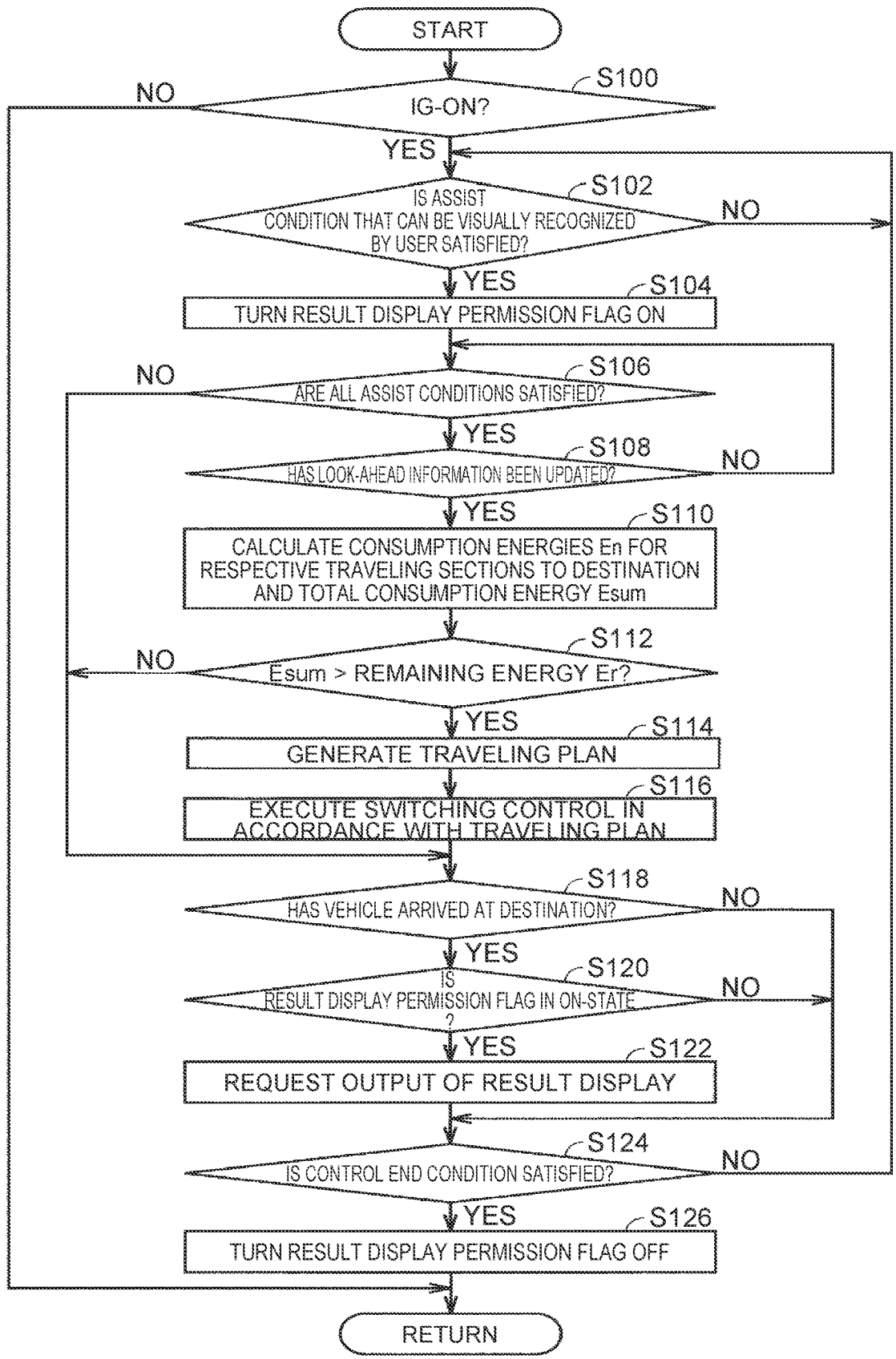
FIG. 3 is a flowchart showing an exemplary process that is executed by an HV-ECU.

An exemplary control process that is executed by the HV-ECU 300 will be described below with reference to FIG. 3. FIG. 3 is a flowchart showing an exemplary process that is executed by the HV-ECU 300. A sequence of processes shown in the flowchart is repeatedly executed by the HV-ECU 300 with a predetermined control period.

In step 100 (step is referred to as S, hereinafter), the HV-ECU 300 determines whether an IG-on is satisfied. For example, when an activation operation for a system of the vehicle 1 is performed by the user and the IG switch 310 is put into the on-state, the HV-ECU 300 puts an IG flag into the on-state. In the case where the IG flag is in the on-state, the HV-ECU 300 determines that the IG-on is satisfied. Alternatively, for example, in the case where the SMR 50 is in the closing state, the HV-ECU 300 may determine that the IG-on is satisfied. In the case where it is determined that the IG-on is satisfied (YES in S100), the process transitions to S102. In the case where it is determined that the IG-on is not satisfied (NO in S100), the process ends.

In S102, the HV-ECU 300 determines whether an assist condition that can be visually recognized by the user is satisfied.

The assist condition that can be visually recognized by the user means an assist condition that is of the assist conditions for executing the above-described switching control and for which the satisfaction can be visually recognized on the HMI device 330 by the user. For example, in the case where the first information indicating that the switching control is capable of being executed is displayed on the HMI device 330 and where the second information indicating that the switching control is not executed is not displayed on the HMI device 330, the HV-ECU 300 determines that the assist condition that can be visually recognized by the user is satisfied.

That is, for example, the assist condition that can be visually recognized by the user includes a condition that the CD mode in which the switching control can be executed has been selected as the control mode (that is, a condition that a control mode in which the switching control is not executed has not been selected), a condition that the guidance for the traveling to the destination of the vehicle 1 is being executed, a condition that the vehicle 1 is traveling on the traveling route, and a condition that a warning display showing an abnormality (an over discharge, deterioration abnormality, high-temperature abnormality or other abnormalities of the electric storage device 100) has not been performed in the vehicle 1.

In the case where it is determined that the assist condition that can be visually recognized by the user is satisfied (YES in S102), the process transitions to S104. In the case where it is determined that the assist condition that can be visually executed by the user is not satisfied (NO in S102), the process returns to S102.

In S104, the HV-ECU 300 sets a result display permission flag to the on-state. When the result display permission flag is in the on-state, the third information is permitted to be displayed on the HMI device 330.

In S106, the HV-ECU 300 determines whether all of the assist conditions (referred to as all assist conditions, hereinafter) are satisfied. All assist conditions include assist conditions that cannot be visually recognized by the user, in addition to the above-described assist conditions that can be visually recognized by the user. For example, the assist conditions that cannot be visually recognized by the user include a condition that the engine 14 has not been actuated, a condition that the SOC of the electric storage device 100 is equal to or higher than a threshold for executing the switching control, for example, the switching threshold for the switching of the control mode from the CD mode to the CS mode, and a condition that the temperature of the electric storage device 100 is equal to or higher than a threshold for indicating that the electric storage device 100 is not in a low-temperature state. The assist conditions are not limited to them. In the case where it is determined that all assist conditions are satisfied (YES in S106), the process transitions to S108. In the case where it is determined that all assist conditions are not satisfied (NO in S106), the process transitions to S118.

In S108, the HV-ECU 300 determines whether the look-ahead information received from the navigation ECU 350 has been updated. For example, in the case where a variety of information relevant to the look-ahead information, as exemplified by the predetermined road traffic information, has been received, the HV-ECU 300 determines that the look-ahead information has been updated. In the case where it is determined that the look-ahead information has been updated (YES in S108), the process transitions to S110. In the case where it is determined that the look-ahead information has not been updated (NO in S108), the process returns to S106.

In S110, the HV-ECU 300 calculates the consumption energies En for the respective traveling sections, based on the grade information, road category information, road traffic information and others about the respective traveling sections that are included in the look-ahead information. The calculation method has been described above, and therefore, detailed descriptions are not repeated. Further, the HV-ECU 300 calculates the sum (total) of the consumption energies En for the respective traveling sections, as the total consumption energy Esum.

In S112, the HV-ECU 300 determines whether the total consumption energy Esum is larger than the remaining energy Er of the electric storage device 100. The remaining energy Er has been described above, and therefore, detailed descriptions are not repeated. In the case where it is determined that the total consumption energy Esum is larger than the remaining energy Er (YES in S112), the process transitions to S114. In the case where it is determined that the total consumption energy Esum is equal to or smaller than the remaining energy Er (NO in S112), the process transitions to S118.

In S114, the HV-ECU 300 generates the traveling plan. More specifically, the HV-ECU 300 assigns the CD mode to the traveling sections designated as the CD mode preference section. For example, the CD mode preference section is previously set depending on the category in the road category information (information such as urban district, expressway and general road) included in the look-ahead information. For example, the traveling section including the urban district or the minor street is previously stored in the HV-ECU 300 or the navigation ECU 350 as the CD mode preference section, or the traveling section corresponding to the CD mode preference section is received as the road traffic information.

Furthermore, the HV-ECU 300 assigns the CD mode to traveling sections other than the CD mode preference section. The HV-ECU 300 sorts the traveling sections that are not designated as the CD mode preference section, in ascending order of the consumption energy En, and assigns the CD mode to the sorted traveling sections in ascending order of the consumption energy En. The HV-ECU 300 assigns the CD mode until the total of the consumption energies for the traveling sections to which the CD mode is assigned exceeds the remaining energy. The HV-ECU 300 stops assigning the CD mode at the time when the total of the consumption energies for the traveling sections to which the CD mode is assigned exceeds the remaining energy.

Furthermore, the HV-ECU 300 assigns the CS mode to non-assignment sections for the CD mode. The HV-ECU 300 assigns the CS mode to the traveling sections to which the CD mode is not assigned. One of the CD mode and the CS mode is assigned to the plurality of traveling sections, and thereby, the traveling plan is generated. By switching the control mode in accordance with the traveling plan, it is possible to keep the SOC of the electric storage device 100 within the predetermined range when the vehicle 1 arrives at the destination, and it is possible to use up the electric storage amount of the electric storage device 100 without excess or deficiency.

In S116, the HV-ECU 300 executes the switching control for the control mode in accordance with the generated traveling plan. When the switching control is started, the HV-ECU 300 switches the control mode in accordance with the traveling plan, and therewith, calculates an electric traveling distance under the execution of the switching control and an estimated value of the electric traveling distance when the switching control is not executed. Hereinafter, the electric traveling distance under the execution of the switching control is referred to as an assist EV traveling distance, and the estimated value of the electric traveling distance when the switching control is not executed is referred to as a non-assist EV traveling distance.

For example, after the switching control is started, the HV-ECU 300 calculates the electric traveling distance with a previously decided period, and integrates the electric traveling distance in a state where the engine 14 is stopped, to the current time. Thereby, the HV-ECU 300 calculates the electric traveling distance after the start of the switching control, as the assist EV traveling distance.

Furthermore, for example, the HV-ECU 300 calculates the electric traveling distance in the state where the engine 14 is stopped assuming that the CD mode is continued from the time of the start of the switching control to the current time, as the non-assist electric traveling distance. In the case where the SOC of the electric storage device 100 reaches the switching threshold for the switching from the CD mode to the CS mode after the time of the start of the switching control and before the current time, the HV-ECU 300 calculates the electric traveling distance in the state where the engine 14 is stopped from the time of the start of the switching control to the reaching time, as the non-assist electric traveling distance. After the HV-ECU 300 executes the switching control in accordance with the traveling plan, the process transitions to S118.

In S118, the HV-ECU 300 determines whether the vehicle 1 has arrived at the destination. For example, in the case where the HV-ECU 300 receives, from the navigation ECU 350, information indicating a determination result of the arrival of the vehicle 1 at the destination because the current position of the vehicle 1 is within a predetermined range including the destination, the HV-ECU 300 determines that the vehicle 1 has arrived at the destination. In the case where it is determined that the vehicle 1 has arrived at the destination (YES in S118), the process transitions to S120. In the case where it is determined that the vehicle 1 has not arrived at the destination (NO in S118), the process transitions to S124.

In S120, the HV-ECU 300 determines whether the result display permission flag is in the on-state. In the case where it is determined that the result display permission flag is in the on-state (YES in S120), the process transitions to S122. In the case where it is determined that the result display permission flag is in the off-state (NO in S120), the process transitions to S124.

In S122, the HV-ECU 300 outputs a result display. More specifically, to the navigation ECU 350, the HV-ECU 300 outputs a signal indicating an output request for a result display that corresponds to the third information.

For example, in the case where all assist conditions are satisfied and where the switching control is executed, the HV-ECU 300 outputs the output request to the navigation ECU 350, such that the navigation ECU 350 outputs information indicating how much the assist EV traveling distance has been increased compared to the non-assist EV traveling distance, as the result display.

In the case where the navigation ECU 350 receives such an output request from the HV-ECU 300, the navigation ECU 350 displays the information relevant to the effect of the execution of the switching control on the navigation screen of the HMI device 330, as shown in FIG. 2.

On the other hand, for example, in the case where all assist conditions are not satisfied and where the switching control is not executed, the HV-ECU 300 outputs the output request to the navigation ECU 350, such that the navigation ECU 350 outputs the information relevant to the prompt of the use of the switching control or the information relevant to the execution situation of the switching control, as the result display.

In the case where the navigation ECU 350 receives such an output request from the HV-ECU 300, for example, the navigation ECU 350 displays the information relevant to the prompt of the use of the switching control, as exemplified by "Please, set your destination" for prompting the setting of the destination, or the information relevant to the execution situation of the switching control, as exemplified by "The eco-driving (fuel-efficient driving) has been executed", on the HMI device 330.

In S124, the HV-ECU 300 determines whether a control end condition is satisfied. For example, the control end condition includes at least one of a condition that the plug-in charge is executed, a condition that another control mode other than the CD mode is selected as the control mode, and a condition that the vehicle 1 has an abnormality, that is, a condition that a previously decided abnormal state (an abnormality of various sensors or a behavior abnormality of electrical equipment equipped in the vehicle 1) is detected by the execution of a predetermined self-diagnosis process. The condition that the plug-in charge is executed is, for example, a condition that the charge relay 60 is in the closing state and the electric power of the external power source 92 is supplied to the electric storage device 100 through the charge device 70. In the case where it is determined that the control end condition is satisfied (YES in S124), the process transitions to S126. In the case where it is determined that the control end condition is not satisfied (NO in S124), the process returns to S102.

In S126, the HV-ECU 300 sets the result display permission flag to the off-state. After the HV-ECU 300 sets the result display permission flag to the off-state, the process ends.

Behaviors of the HV-ECU 300 and navigation ECU 350 equipped in the vehicle 1 in the embodiment based on the above structure and flowchart will be described.

For example, in the case where the vehicle 1 is activated by the activation operation from the user, the IG flag is in the on-state (YES in S100), and therefore, it is determined whether the assist condition that can be visually recognized by the user is satisfied (S102). In the case where the first information including the information indicating that the CD mode has been selected as the control mode, the information indicating that the guidance for traveling is being executed, and the information indicating that the vehicle 1 is traveling on the set traveling route is displayed on the HMI device 330 and where the second information is not displayed on the HMI device 330, the assist condition that can be visually recognized by the user is satisfied (YES in S102), and therefore, the result display permission flag is put into the on-state (S104).

Then, when it is determined that all assist conditions are satisfied (YES in S106), it is determined whether the look-ahead information has been updated (S108). When the look-ahead information corresponding to the traveling route set by the receiving of the road traffic information is generated by the navigation ECU 350 and the HV-ECU 300 receives the generated look-ahead information from the navigation ECU 350, it is determined that the look-ahead information has been updated (YES in S108). Therefore, the consumption energies En for the plurality of traveling sections constituting the traveling route are calculated based on the look-ahead information, and the total of the consumption energies En is calculated as the total consumption energy Esum (S110).

In the case where the total consumption energy Esum is larger than the remaining energy Er (YES in S112), the traveling plan is generated (S114). That is, first the CD mode is assigned to the CD mode preference sections. Then, the CD mode is assigned to traveling sections other than the CD mode preference sections in ascending order of the consumption energy, until the total consumption energy for the traveling sections to which the CD mode is assigned exceeds the remaining energy of the electric storage device 100. Finally, the CS mode is assigned to the traveling sections to which the CD mode is not assigned.

After the control mode is assigned to all traveling sections and the traveling plan corresponding to the traveling route is generated, the switching control for the control mode is executed in accordance with the traveling plan (S116).

A sequence of processes relevant to the switching control is repeated until the vehicle 1 arrives at the destination. When the vehicle 1 arrives at the destination (YES in S118), the output request for the result display is output to the navigation ECU 350, in the case where the result display permission flag is in the on-state (YES in S120). At this time, information for displaying the display content shown in FIG. 2 on the display screen of the HMI device 330 is sent to the navigation ECU 350. Then, when the control end condition is satisfied, for example, due to the end of the traveling guidance (YES in S124), the result display permission flag is put into the off-state (S126).

On the other hand, in the case where the assist condition that can be visually recognized by the user is not satisfied (NO in S102), for example, in the case where the display screen displays that a control mode that is other than the CD mode and in which the switching control is not executed has been selected, the output request for the result display is not sent from the HV-ECU 300 to the navigation ECU 350. Therefore, even when the vehicle 1 arrives at the destination, information corresponding to the third information is not displayed on the HMI device 330.

Furthermore, even when the assist condition that can be visually recognized by the user is satisfied (YES in S102) and the result display permission flag is in the on-state (S104), in the case where all assist conditions are not satisfied, for example, because the electric storage device 100 is in the low-temperature state (NO in S106), the result display permission flag is in the on-state when the vehicle 1 arrives at the destination (YES in S118). Therefore, the output request for the result display is sent to the navigation ECU 350. At this time, the information for displaying the display content shown in FIG. 2 on the HMI device 330 is not generated, and therefore, is not sent to the navigation ECU 350. Therefore, for example, the navigation ECU 350 displays the information relevant to the prompt of the use of the switching control, on the HMI device 330.

The information to be displayed on the HMI device 330 by the navigation ECU 350 is set depending on information that is exchanged between the HV-ECU 300 and the navigation ECU 350.

Figure 4:
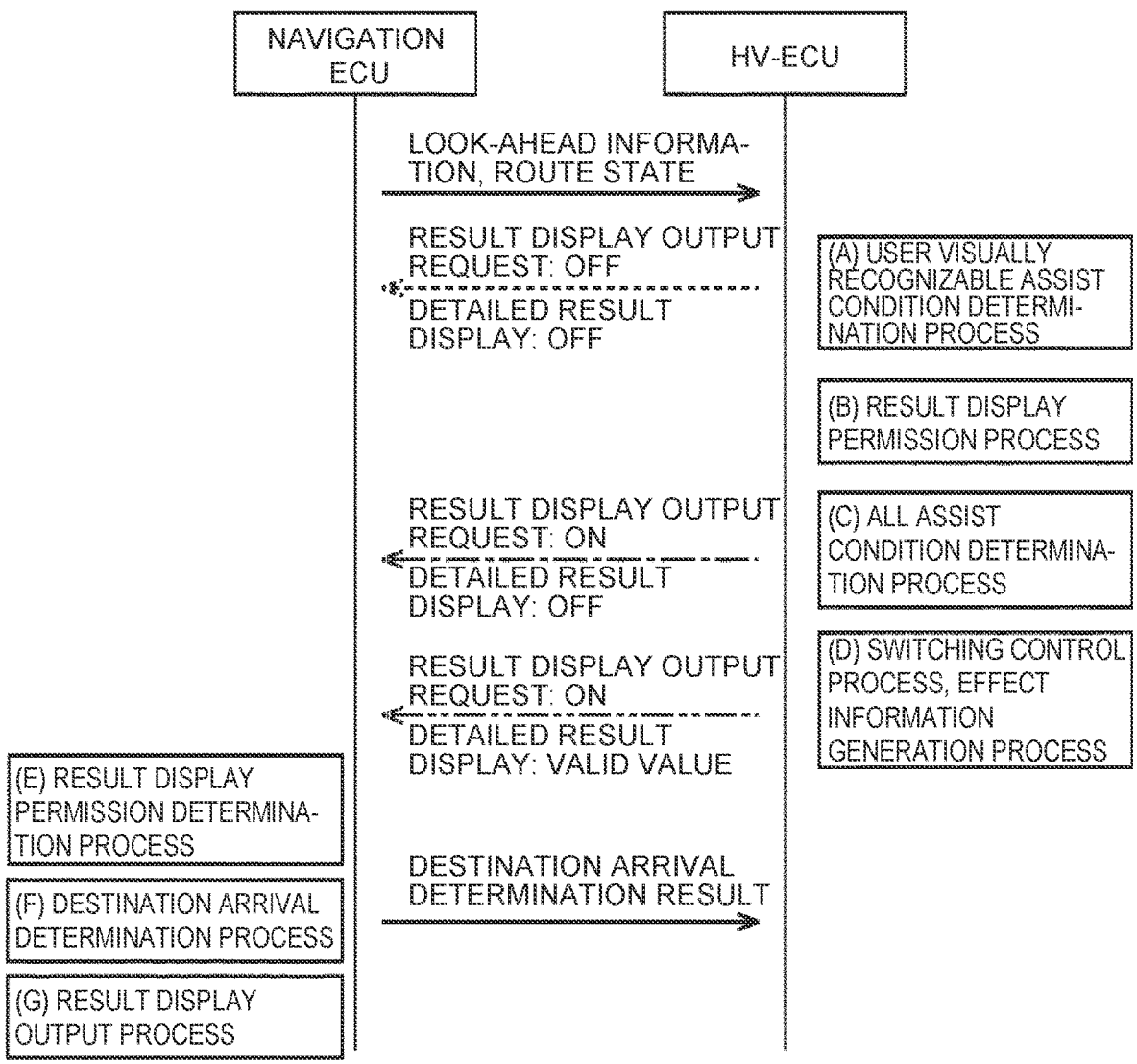
FIG. 4 is a diagram for describing exemplary behaviors of the HV-ECU and a navigation ECU.

The information that is exchanged between the HV-ECU 300 and the navigation ECU 350 and various exemplary processes that are executed by the HV-ECU 300 and the navigation ECU 350 will be described below with use of FIG. 4. FIG. 4 is a diagram for describing exemplary behaviors of the HV-ECU 300 and the navigation ECU 350.

From the navigation ECU 350 to the HV-ECU 300, the look-ahead information and information (information about the traveling position on the traveling route, or the like) relevant to a route state are sent, whenever a predetermined period lapses. On the other hand, from the HV-ECU 300 to the navigation ECU 350, the output request for the result display and information for performing detailed result display, that is, information relevant to the effect of the execution of the switching control are output depending on the traveling state.

For example, in the case where the HV-ECU 300 determines that the assist condition that can be visually recognized by the user is not satisfied in a determination process for the user visually recognizable assist condition shown in (A) of FIG. 4, neither the output request for the result display nor the information for performing the detailed result display are sent from the HV-ECU 300 to the navigation ECU 350 (that is, both are in the off-state), as shown by a broken-line arrow in FIG. 4.

In this case, a result display permission process in (B) of FIG. 4 is not executed, and the output request for the result display is not sent from the HV-ECU 300. Therefore, the navigation ECU 350 determines that the result display is not permitted in a result display permission determination process in (E) of FIG. 4. Therefore, in the case where the navigation ECU 350 determines that the current position of the vehicle 1 is within a predetermined range including the destination (that is, the vehicle 1 has arrived at the destination) in a destination arrival determined process shown in (F) of FIG. 4, the navigation ECU 350 does not perform the result display to the HMI device 330 in a result display output process shown in (G) of FIG. 4.

On the other hand, in the case where the HV-ECU 300 determines that the assist condition that can be visually recognized by the user is satisfied in the determination process for the user visually recognizable assist condition shown in (A) of FIG. 4, the HV-ECU 300 executes the result display permission process shown in (B) of the FIG. 4, and puts the result display permission flag into the on-state. However, in the case where the HV-ECU 300 determines that all assist conditions are not satisfied in a determination process for all assist conditions shown in (C) of FIG. 4, the switching control is not executed. Therefore, as shown by a chain-line arrow in FIG. 4, the output request for the result display is sent from the HV-ECU 300 to the navigation ECU 350, but the information for performing the detailed result display is not from the HV-ECU 300 to the navigation ECU 350. That is, the output request for the result display is in the on-state, and the detailed result display is in the off-state.

In this case, the navigation ECU 350 permits the result display in the result display permission determination process shown in (E) of FIG. 4, but does not receive the information for performing the detailed result display. Therefore, in the case where the navigation ECU 350 determines that the vehicle 1 has arrived at the destination in the destination arrival determination process show in (F) of FIG. 4, the navigation ECU 350 displays at least one of the information relevant to the prompt of the use of the switching control, as exemplified by "Please, set your destination" for prompting the setting of the destination, and the information relevant to the execution situation of the switching control, as exemplified by "The eco-driving (fuel-efficient driving) has been executed", on the HMI device 330 as the result display in the result display output process shown in (G) of FIG. 4.

Furthermore, in the case where the HV-ECU 300 determines that the assist condition that can be visually recognized by the user is satisfied in the determination process for the user visually recognizable assist condition shown in (A) of FIG. 4, the HV-ECU 300 executes the result display permission process shown in (B) of FIG. 4, and puts the result display permission flag into the on-state. Then, in the case where the HV-ECU 300 determines that all assist conditions are satisfied in the determination process for all assist conditions shown in (C) of FIG. 4, the switching control is executed. Therefore, as shown by a two-dot chain-line arrow in FIG. 4, the output request for the result display and the information for performing the detailed result display are sent from the HV-ECU 300 to the navigation ECU 350.

In this case, the navigation ECU 350 permits the result display in the result display permission determination process shown in (E) of FIG. 4, and receives the information for performing the detailed result display, from the HV-ECU 300. Therefore, in the case where the navigation ECU 350 determines that the vehicle 1 has arrived at the destination in the destination arrival determination process shown in (F) of FIG. 4, the navigation ECU 350 displays the display content shown in FIG. 2 on the HMI device 330, in the result display output process shown in (G) of FIG. 4.

Various traveling patterns and various exemplary displays that are displayed on the HMI device 330 depending on the traveling pattern will be described below with reference to FIG. 5 to FIG. 7.

Figure 5:
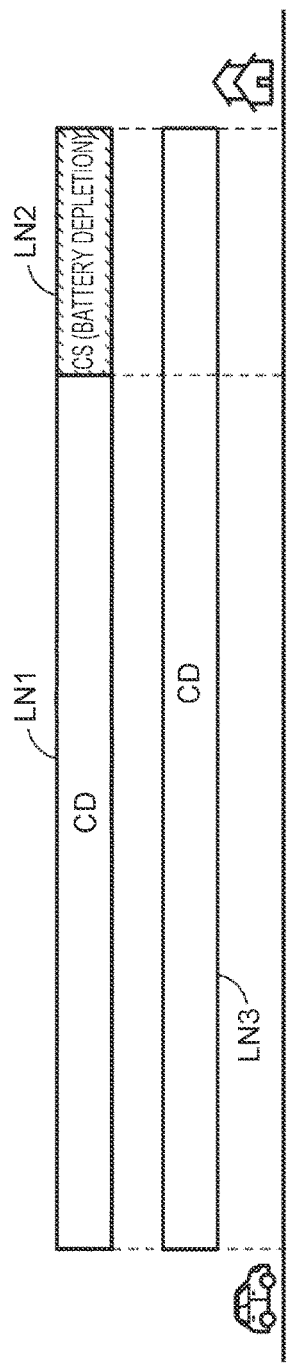
FIG. 5 shows an exemplary traveling pattern in the case where an assist condition that can be visually recognized by a user is satisfied.

FIG. 5 shows an exemplary traveling pattern in the case where the assist condition that can visually recognized by the user is satisfied. LN1 and LN2 in FIG. 5 show states of the control mode in the case where the SOC of the electric storage device 100 becomes equal to or lower than the switching threshold for the switching from the CD mode to the CS mode during traveling. LN3 in FIG. 5 shows a state of the control mode in the case where the SOC of the electric storage device 100 is so high that the SOC of the electric storage device 100 does not fall below the switching threshold for the switching from the CD mode to the CS mode until the vehicle 1 arrives at the destination.

As shown by LN1 in FIG. 5, when the CD mode is selected and the assist condition that can be visually recognized by the user is satisfied (YES in S102), the result display permission flag is put into the on-state (S104). At this time, when the state where all assist conditions are not satisfied continues (NO in S106), the driving of the vehicle 1 is continued without the execution of the switching control. At this time, the SOC of the electric storage device 100 decreases as the traveling distance of the vehicle 1 in the CD mode increases. Then, when the SOC of the electric storage device 100 becomes the switching threshold, the control mode is switched from the CD mode to the CS mode due to battery depletion, as shown by LN2 in FIG. 5.

Thereafter, when the vehicle 1 has arrived at the destination (YES in S118), since the result display permission flag is in the on-state (YES in S120), the output request for the result display is sent to the navigation ECU 350. Since the switching control is not executed, the navigation ECU 350 outputs the information relevant to the prompt of the use of the switching control, as exemplified by "Please, set your destination", or the information relevant to the execution situation of the switching control, as exemplified by "The eco-driving (fuel-efficient driving) has been executed", for example.

On the other hand, as shown by LN3 in FIG. 5, when the CD mode is selected and the assist condition that can be visually recognized by the user is satisfied (YES in S102), the result display permission flag is put into the on-state (S104). At this time, in the case where all assist conditions are satisfied (YES in S106), where the look-ahead information has been updated (YES in S108) and where the calculated total consumption energy Esum is equal to or smaller than the remaining energy Er (NO in S112) when the total consumption energy Esum is calculated (S110), the CD mode is maintained without the execution of the switching control.

Thereafter, when the vehicle 1 has arrived at the destination (YES in S118), the output request for the result display is sent to the navigation ECU 350, because the result display permission flag is in the on-state (YES in S120). Since the switching control is not executed, for example, the navigation ECU 350 outputs the information relevant to the prompt of the use of the switching control, as exemplified by "Please, set your destination", or the information relevant to the execution situation of the switching control, as exemplified by "The eco-driving (fuel-efficient driving) has been executed".

Figure 6:
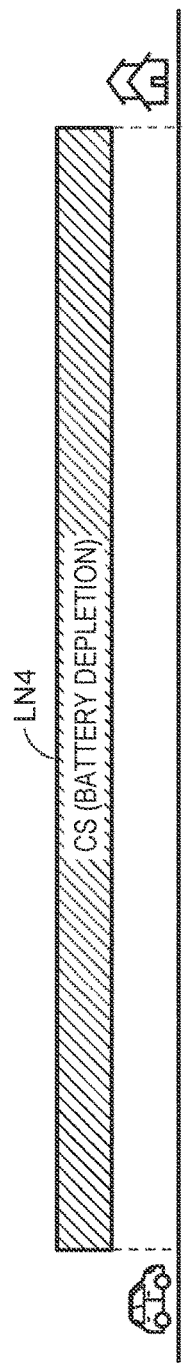
FIG. 6 shows an exemplary traveling pattern in the case where the assist condition that can be visually recognized by the user is not satisfied.

FIG. 6 shows an exemplary traveling pattern in the case where the assist condition that can be visually recognized by the user is not satisfied. LN4 in FIG. 6 shows a state of the control mode in the case where the SOC of the electric storage device 100 is equal to or lower than the switching threshold.

As shown by LN4 in FIG. 6, in the case where the SOC of the electric storage device 100 is equal to or lower than the switching threshold, the CS mode is selected as the control mode, and the state of the selection of the CS mode is maintained. In the case where the assist condition that can be visually recognized by the user is not satisfied (NO in S102), the result display permission flag is not turned on. Therefore, even when the vehicle 1 arrives at the destination, the navigation ECU 350 does not receive the output request for the result display from the HV-ECU 300, and therefore, the information relevant to the switching control is not displayed on the HMI device 330.

Figure 7:
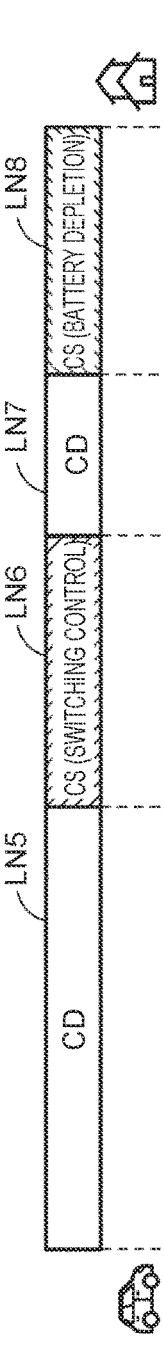
FIG. 7 shows an exemplary traveling pattern in the case where all assist conditions are satisfied.

FIG. 7 shows an exemplary traveling pattern in the case where all assist conditions are satisfied. LN5, LN6, LN7 and LN8 in FIG. 7 shows states of the control mode in the case where all assist conditions are satisfied and where the switching control is executed.

As shown by LN5 in FIG. 7, when the CD mode is selected and the assist condition that can be visually recognized by the user is satisfied (YES in S102), the result display permission flag is put into the on-state (S104). At this time, when all assist conditions are satisfied (YES in S106), at the timing when the look-ahead information has been updated (YES in S108), a sequence of processes (S110 to S114) for generating the traveling plan for the switching control is executed, and the switching control is executed in accordance with the generated traveling plan (S116).

Therefore, as shown by LN5 and LN6 in FIG. 7, when the vehicle 1 arrives at a predetermined switching position in accordance with the traveling plan, the control mode is switched from the CD mode to the CS mode. Furthermore, as shown by LN6 and LN7 in FIG. 7, when the vehicle 1 arrives at a predetermined switching position in accordance with the traveling plan, the control mode is switched from the CS mode to the CD mode. Furthermore, as shown by LN7 and LN8 in FIG. 7, when the SOC of the electric storage device 100 becomes equal to or lower than the switching threshold, the control mode is put from the CD mode to the CS mode. Until the vehicle 1 arrives at the destination, the assist EV traveling distance and the non-assist EV traveling distance are calculated.

Thereafter, when the vehicle 1 has arrived at the destination (YES in S118), since the result display permission flag is in the on-state (YES in S120), the output request for the result display and the information for displaying the display content in FIG. 2, that is, the information relevant to the assist EV traveling distance and the non-assist EV traveling distance are sent to the navigation ECU 350 (S122). The navigation ECU 350 displays the display content shown in FIG. 2, on the HMI device 330.

As described above, with the hybrid vehicle according to the embodiment, when the first information including at least one of the information indicating that the CD mode has been selected, the information indicating that the route guidance is being executed and the information indicating that the vehicle 1 is traveling on the traveling route is displayed on the HMI device 330, the user can recognize that the switching control is capable of being executed. Further, when the second information including at least one of the information indicating that another control mode that is other than the CD mode and in which the switching control is not executed has been selected, the information indicating that the SOC of the electric storage device 100 is lower than the threshold and the electric storage device is in the depletion state, and information indicating that the electric storage device 100 has the high-temperature abnormality or the deterioration abnormality is displayed on the HMI device 330, the user can recognize that the switching control is not executed. Therefore, in the case where the first information is reported, the information relevant to the switching control, as exemplary by the information relevant to the effect of the execution of the switching control, is reported using the report device, and in the case where the second information is reported, the information relevant to the switching control is not reported. Thereby, it is possible to avoid a report having a content about which the user has a strangeness feeling. Accordingly, it is possible to provide a hybrid vehicle that reports the content about the switching control depending on the traveling situation such that the content matches with the execution situation that can be recognized by the user.

Furthermore, in the case where the first information is displayed on the HMI device 330 and where the switching control is not executed, when the information relevant to the prompt of the use of the switching control, as exemplified by "Please, set your destination", or the information relevant to the execution situation of the switching control, as exemplified by "The eco-driving has been executed", is displayed on the HMI device 330, it is possible to report the content that matches with the execution situation that can be recognized by the user.

Modifications will be described below.

In the above-described embodiment, the vehicle 1 is a series-parallel type hybrid vehicle, for example. However, the vehicle 1 only needs to be a hybrid vehicle in which at least the CD mode and the CS mode can be set, and may be another type of hybrid vehicle such as a series type hybrid vehicle.

Furthermore, in the above-described embodiment, the remaining energy Er is an energy equivalent to an electric power amount that is consumed until the SOC of the electric storage device 100 is changed from the current value to a value in the predetermined range. However, a value resulting from adding a certain margin to that energy may be adopted as the remaining energy.

Furthermore, in the above-described embodiment, in the case where the first information is displayed on the HMI device 330, the information relevant to the switching control is reported, and in the case where the second information is displayed on the HMI device 330, the information relevant to the switching control is not reported. However, in the case where the first information and the second information are displayed on the HMI device 330, the information relevant to the switching control does not need to be reported. Thereby, it is possible to avoid the user from having a strangeness feeling about the report content.

Furthermore, in the above-described embodiment, the HV-ECU 300 and the navigation ECU 350 each execute predetermined processes, and thereby, behaves in cooperation while exchanging a variety of information. However, for example, a single ECU having the function of the HV-ECU 300 and the function of the navigation ECU 350 may execute the predetermined processes.

Furthermore, in the above-described embodiment, the information relevant to the switching control is displayed on the HMI device 330. However, the information relevant to the switching control may be displayed on a display device of a portable terminal possessed by the user, instead of or in addition to the HMI device 330.

Figure 8:
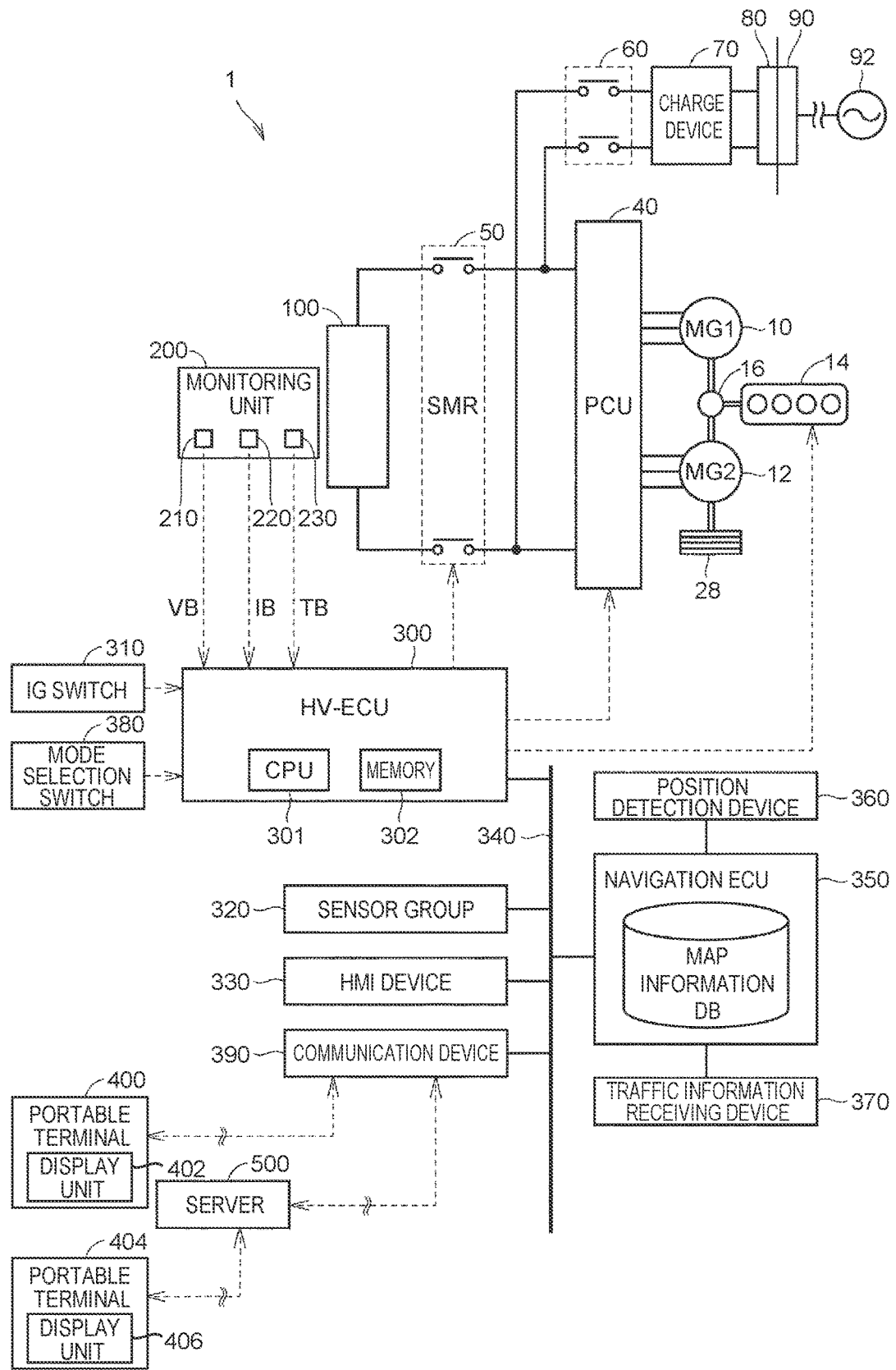
FIG. 8 shows an exemplary configuration of a hybrid vehicle in a modification.

FIG. 8 is a diagram showing an exemplary configuration of a hybrid vehicle in a modification. A vehicle 1 shown in FIG. 8 is different from the vehicle 1 shown in FIG. 1, in that the vehicle 1 shown in FIG. 8 includes a communication device 390 that can communicate with at least one of portable terminals 400, 404 possessed by the user and a server 500 provided in the exterior of the vehicle 1. Except the communication device 390, the configuration of the vehicle 1 shown in FIG. 8 is the same as the configuration of the vehicle 1 shown in FIG. 1. Therefore, detailed descriptions are not repeated.

As shown in FIG. 8, the vehicle 1 further includes the communication device 390. The communication device 390 is configured to be capable of communicating with at least one of the portable terminal 400 that is possessed by the user of the vehicle 1 and the portable terminal 404 that communicates with the server 500 provided in the exterior of the vehicle 1.

For example, the communication device 390 and the portable terminal 400 may be connected so as to be capable of communicating by a predetermined short-range wireless communication with a previous pairing process, may be connected so as to be capable of communicating by a wireless communication such as a wireless local area network through an unillustrated base station, or may be connected so as to be directly capable of communicating by wire.

The portable terminal 400 is provided with a display unit 402. The display unit 402 is configured to be capable of displaying information received from the communication device 390, in a predetermined format. The HV-ECU 300 may send the information relevant to the switching control, to the portable terminal 400, through the communication device 390, and the portable terminal 400 may display the information received from the communication device 390, on the display unit 402. Thereby, the user can recognize the information relevant to the switching control, as exemplified by the effect of the execution of the switching control.

For example, the communication device 390 and the server 500 may be connected so as to be capable of communicating by a wireless communication such as a wireless local area network through an unillustrated base station. For example, the server 500 and the portable terminal 404 may be also connected so as to be capable of communicating by a wireless communication such as a wireless local area network through an unillustrated base station.

The portable terminal 404 is provided with a display unit 406. The display unit 406 is configured to be capable of displaying information received from the communication device 390 through the server 500, in a predetermined format. The HV-ECU 300 may send the information relevant to the switching control, to the portable terminal 404, through the communication device 390 and the server 500, and the portable terminal 404 may display the information received from the communication device 390, on the display unit 406. Thereby, the user can recognize the information relevant to the switching control, as exemplified by the effect of the execution of the switching control.

Furthermore, in the above-described embodiment, in the case where the first information is reported and where the switching control is executed, the information relevant to the effect of the execution of the switching control is reported when the vehicle 1 arrives at the destination. However, for example, even in the case where the first information is reported and where the switching control is executed, when a stop condition for stopping the switching control is satisfied before the vehicle 1 arrives at the destination, the information relevant to the effect of the execution of the switching control before the satisfaction of the stop condition may be deleted.

Figure 9:
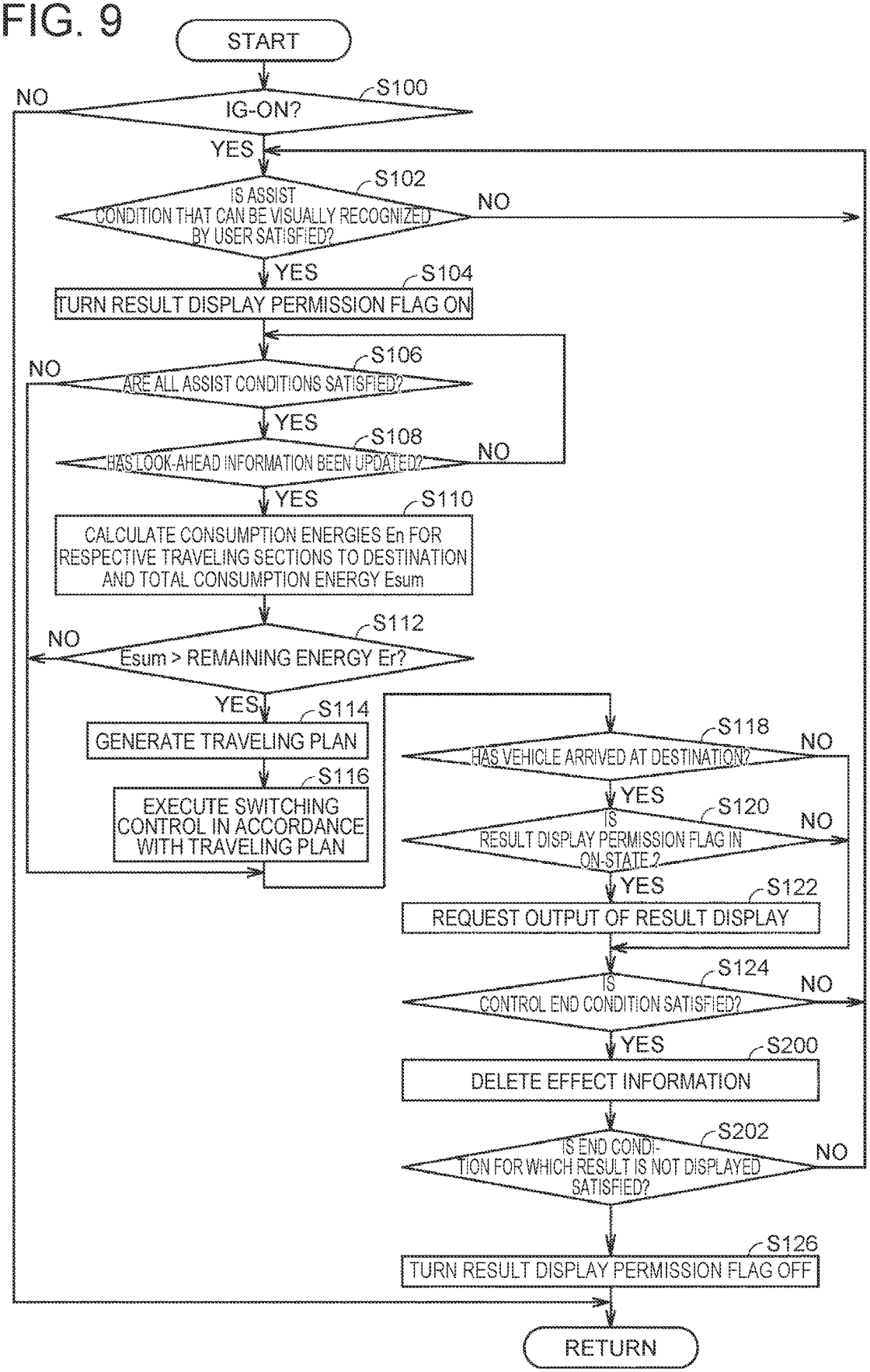
FIG. 9 is a flowchart showing an exemplary process that is executed by an HV-ECU in a modification.

FIG. 9 is a flowchart showing an exemplary process that is executed by the HV-ECU 300 in a modification.

The process shown in the flowchart of FIG. 9 is different from the process shown in the flowchart of FIG. 3, in that the process shown in the flowchart of FIG. 9 further includes a process of S200 and a process of S202. The processes other than S200 and S202 in FIG. 9 are the same as the processes shown in the flowchart of FIG. 3, except the following description, and are denoted by the same step numbers. Therefore, detailed descriptions are not repeated.

In the case where it is determined that the control end condition is satisfied (YES in S124), the process transitions to S200. In S200, the HV-ECU 300 deletes effect information. That is, the HV-ECU 300 deletes recently generated information relevant to the effect of the execution of the switching control.

In S202, the HV-ECU 300 determines where an end condition for which the result is not displayed is satisfied. For example, the end condition for which the result is not displayed includes a condition of satisfaction of at least one of a condition that the vehicle 1 has an abnormality, a condition that the route guidance is stopped due to a cancellation operation for the route guidance, the delete of the destination, or the like, and a condition that a control mode other than the CD mode is selected. In the case where it is determined that the end condition for which the result is not displayed is satisfied (YES in S202), the process transitions to S126.

A behavior of the HV-ECU 300 in the modification based on the above structure and the above flowchart will be described.

For example, in the case where the vehicle 1 is activated by the activation operation from the user, the IG flag is in the on-state (YES in S100), and therefore, it is determined whether the assist condition that can be visually recognized by the user is satisfied (S102). In the case where the first information including the information indicating that the CD mode has been selected as the control mode, the information indicating that the guidance for traveling is being executed, and information indicating that the vehicle 1 is traveling on the set traveling route is displayed on the HMI device 330 and where the second information is not displayed on the HMI device 330, the assist condition that can be visually recognized by the user is satisfied (YES in S102), and therefore, the result display permission flag is put into the on-state (S104).

Then, when it is determined that all assist conditions are satisfied (YES in S106), at the timing when the look-ahead information has been updated (YES in S108), the consumption energies En for the plurality of traveling sections constituting the traveling route are calculated, and the total of the consumption energies En is calculated as the total consumption energy Esum (S110).

In the case where the total consumption energy Esum is larger than the remaining energy Er (YES in S112), the traveling plan is generated (S114), and the switching control for the control mode is executed in accordance with the generated traveling plan (S116).

During the execution of the switching control, in the case where the control end condition is satisfied (YES in S124), for example, due to the selection of the control mode other than the CD mode, before the vehicle 1 arrives at the destination (NO in S118), the effect information before the control end condition is satisfied is deleted (S200). At this time, in the case where the end condition for which the result is not displayed is satisfied (YES in S202), for example, due to the cancellation of the traveling guidance, the result display permission flag is put into the off-state (S126). Therefore, even when the vehicle 1 arrives at the destination after that, the information relevant to the switching control is not displayed on the HMI device 330.

On the other hand, after the effect information is deleted (S200), in the case where the assist condition that can be visually recognized by the user is satisfied (YES in S102) without the satisfaction of the end condition for which the result is not displayed (NO in S202), for example, in the case where the CD mode is selected as the control mode again, the result display permission flag is put into the on-state again (S104). In the case where all assist conditions are satisfied after that (YES in S106) and where the switching control is executed, the information for displaying the display content in FIG. 2 is generated. When the vehicle 1 arrives at the destination (YES in S118), since the result display permission flag is in the on-state (YES in S120), the information for displaying the display content in FIG. 2 is sent to the navigation ECU 350 together with the output request for the result display (S122), so that the information for displaying the display content in FIG. 2 is displayed on the HMI device 330.

On the other hand, in the case where the result display permission flag is put into the on-state again (S104), where all assist conditions are not satisfied after that (NO in S106) and where the switching control is not execute, the result display permission flag is in the on-state (YES in S120) when the vehicle 1 arrives at the destination (YES in S118). Therefore, the output request for the result display is sent to the navigation ECU 350 (S122), and the information for displaying the display content in FIG. 2 is not sent to the navigation ECU 350. Therefore, the information relevant to the prompt of the use of the switching control, as exemplified by "Please, set your destination" for prompting the setting of the destination, or the information relevant to the execution situation of the switching control, as exemplified by "The eco-driving has been executed" is displayed on the HMI device 330.

A display example that is displayed on the HMI device 330 depending on the traveling pattern will be described below with reference to FIG. 10.

FIG. 10 shows an exemplary traveling pattern in the case where a control mode other than the CD mode is temporarily selected during the execution of the switching control in accordance with the traveling plan. LN9, LN10, LN11, LN12, LN13 and LN14 in FIG. 10 show states of the control mode until the vehicle 1 arrives at the destination.

As shown by LN9 in FIG. 10, when the CD mode is selected and the assist condition that can be visually recognized by the user is satisfied (YES in S102), the result display permission flag is put into the on-state (S104). At this time, when all assist conditions are satisfied (YES in S106), at the timing when the look-ahead information has been updated (YES in S108), a sequence of processes (S110 to S114) for generating the traveling plan for the switching control is executed, and the switching control is executed in accordance with the generated traveling plan (S116). During the execution of the switching control, the information for displaying the display content shown in FIG. 2 is generated.

Then, as shown by LN9 and LN10 in FIG. 10, when the vehicle 1 arrives at a predetermined switching position in accordance with the traveling plan, the control mode is switched from the CD mode to the CS mode.

At this time, the user operates the mode selection switch 380, and as shown by LN10 and LN11 in FIG. 10, the control mode is switched to another control mode in which the switching control is not executed. Then, the control end condition is satisfied (YES in S124), and the effect information is deleted (S200).

Then, when the user operates the mode selection switch 380 again without the satisfaction of the end condition for which the result is not displayed (NO in S202), the selection of the other control mode is cancelled and the CD mode is selected, the assist condition that can be visually recognized is satisfied (YES in S102), and the result display permission flag is put into the on-state again (S104).

Therefore, when all assist conditions are satisfied (YES in S106) and the look-ahead information is updated (YES in S108), a sequence of processes (S110 to S114) for generating the traveling plan for the switching control is executed, and the switching control is executed in accordance with the generated traveling plan (S116). As a result, as shown by LN12 in FIG. 10, the control mode is switched to the CS mode.

Then, as shown by LN12 and LN13 in FIG. 10, when the vehicle 1 arrives at a predetermined switching position in accordance with the traveling plan, the control mode is switched from the CS mode to the CD mode. At this time, the information for displaying the display content shown in FIG. 2 is generated again.

When the traveling in the CD mode continues, the SOC of the electric storage device 100 decreases. When the SOC of the electric storage device 100 becomes equal to or lower than the switching threshold, the control mode is switched from the CD mode to the CS mode, as shown by LN13 and LN14 in FIG. 10.

Then, when the vehicle 1 has arrived at the destination (YES in S118), since the result display permission flag is in the on-state (YES in S120), the output request for the result display is sent (S122). At this time, the information for displaying the display content shown in FIG. 2 is sent to the navigation ECU 350. The navigation ECU 350 displays, on the HMI device 330, information for displaying the display content shown in FIG. 2 for a period that is shown by LN12, LN13 and LN14 in FIG. 10 and that starts at the time when the switching control is restarted.

On the other hand, even in the case where the mode selection switch 380 is operated again, where the assist condition that can be visually recognized by the user is satisfied (YES in S102) and where the result display permission flag is put into the on-state again (S104), the switching control is not executed when all assist conditions are not satisfied (NO in S106). Therefore, the information for displaying the display content shown in FIG. 2 is not generated. In this case, when the vehicle 1 arrives at the destination (YES in S118), the output request for the result display is sent (S122), because the result display permission flag is in the on-state (YES in S120), but the information for displaying the display content shown in FIG. 2 is not sent to the navigation ECU 350. Therefore. the navigation ECU 350 displays the information relevant to the prompt of the use of the switching control, as exemplified by "Please, set your destination" for prompting the setting of the destination, or the information relevant to the execution situation of the switching control, as exemplified by "The eco-driving has been executed", on the HMI device 330.

Thereby, even when the stop condition (control end condition) for stopping the switching control is satisfied during the execution of the switching control, one of the information relevant to the effect of the execution of the switching control, the information relevant to the execution situation of the switching control and the information relevant to the prompt of the use of the switching control is displayed on the HMI device 330. Therefore, it is possible to avoid the user from having a strangeness feeling about the report content.

Furthermore, when the control end condition is satisfied and the switching control is stopped during the execution of the switching control, the information relevant to the effect of the execution of the switching control sometimes becomes incorrect depending on the traveling situation after that. Therefore, by deleting the information, it is possible to avoid the incorrect information from being reported to the user.

Furthermore, in the case where the assist condition is satisfied again after the information relevant to the effect of the execution of the switching control before the satisfaction of the control end condition is deleted at the time of the stop of the switching control and where the information relevant to the effect of the execution of the switching control after that is generated, the generated information is displayed on the HMI device 330. Therefore, it is possible to avoid the user from having a strangeness feeling about the report content. Further, in the case where the assist condition is satisfied again and where the information relevant to the effect of the execution of the switching control is not generated, one of the information relevant to the execution situation of the switching control and the information relevant to the prompt of the use of the switching control is displayed on the HMI device 330. Therefore, it is possible to avoid the user from having a strangeness feeling about the report content.

In the above-described modification, the case where the switching request for the control mode is performed by the operation of the mode selection switch 380 and thereby the control end condition is satisfied during the execution of the switching control has been described as an example. For example, in the case where the plug-in charge is started and thereby the control end condition is satisfied during the execution of the switching control, recently generated information relevant to the effect of the execution of the switching control may be similarly deleted when the control end condition is satisfied.

The above-described modifications may be carried out while all or some of the modifications are appropriately combined.

It should be understood that the embodiments disclosed herein are examples and are not limitative in all respects. It is intended that the scope of the present disclosure is defined not by the above description but by the claims and includes all alterations within meanings and scopes equivalent to the claims.

What is claimed is:

1. A hybrid vehicle comprising:
   an electric motor configured to generate drive force in the hybrid vehicle;
   an electric storage device configured to supply electric power to the electric motor;
   an engine configured to generate generated electric power by which the electric storage device is charged;
   a report device configured to report previously decided information; and
   a controller configured to control the engine and the electric motor in one of a plurality of control modes, the plurality of control modes including a charge depleting mode and a charge sustaining mode, the controller being configured:
   to execute a switching control to switch the control mode in accordance with a traveling plan in which one of the charge depleting mode and the charge sustaining mode is assigned to each of a plurality of sections that constitutes a traveling route to a destination of the hybrid vehicle;
   to report at least one of first information and second information using the report device, the first information indicating that the switching control is capable of being executed, the second information indicating that the switching control is not executed; and to report third information using the report device in a case where the first information is reported by the report device, the third information being relevant to the switching control, and not to report the third information in a case where the second information is reported by the report device.

2. The hybrid vehicle according to claim 1, wherein the controller is configured not to report the third information in a case where the first information and the second information are reported by the report device.

3. The hybrid vehicle according to claim 1, wherein:
the third information includes fourth information, fifth information and sixth information, the fourth information being relevant to an effect of execution of the switching control, the fifth information being relevant to an execution situation of the switching control, the sixth information being relevant to a prompt of use of the switching control; and
the controller is configured to report one of the fourth information, the fifth information and the sixth information using the report device, when a stop condition for stopping the switching control is satisfied during execution of the switching control, in a case where the first information is reported by the report device and where the switching control is executed.

4. The hybrid vehicle according to claim 1, wherein:
the third information includes fourth information, fifth information and sixth information, the fourth information being relevant to an effect of execution of the switching control, the fifth information being relevant to an execution situation of the switching control, the sixth information being relevant to a prompt of use of the switching control; and
the controller is configured to report the sixth information using the report device, in a case where the first information is reported by the report device and where the switching control is not executed.

5. The hybrid vehicle according to claim 1, wherein the controller is configured to delete information that is relevant to an effect of execution of the switching control and that is information before a stop condition for stopping the switching control is satisfied, in a case where the stop condition is satisfied during execution of the switching control.

6. The hybrid vehicle according to claim 5, wherein the controller is configured to report information relevant to an effect of execution of the switching control, using the report device, when the information relevant to the effect of the execution of the switching control is generated, and report one of information relevant to an execution situation of the switching control and information relevant to a prompt of use of the switching control, using the report device, when the information relevant to the effect of the execution of the switching control is not generated, in a case where the switching control is executed again after the information that is relevant to the effect of the execution of the switching control and that is the information before the stop condition is satisfied is deleted.

7. The hybrid vehicle according to claim 1, wherein the first information includes at least one of information indicating that a control mode in which the switching control is executed has been selected, information indicating that a guidance for traveling to the destination is being executed, and information indicating that the hybrid vehicle is traveling on the traveling route.

8. The hybrid vehicle according to claim 1, wherein the second information includes at least one of information indicating that a remaining capacity of the electric storage device is lower than a first threshold, information indicating that a full-charge capacity of the electric storage device is lower than a second threshold, information indicating that the electric storage device is in an abnormal state, and information indicating that a control mode in which the switching control is not executed has been selected.

9. The hybrid vehicle according to claim 1, further comprising a communication device configured to communicate with an external terminal, wherein
the controller is configured not to report the third information, in a case of satisfaction of at least one of a condition that there is an abnormality in communication between the communication device and the external terminal, a condition that stop of execution of the switching control has been requested, a condition that a guidance for traveling to the destination has been cancelled, a condition that the destination has been deleted.

10. The hybrid vehicle according to claim 1, further comprising a communication device configured to communicate with an external portable terminal, wherein
the controller is configured to send the third information to the external portable terminal using the communication device, in addition to reporting the third information using the report device.

11. The hybrid vehicle according to claim 1, further comprising a communication device configured to communicate with a portable terminal through an external server, wherein
the controller is configured to send the third information to the portable terminal using the communication device, in addition to reporting the third information using the report device.

* * * * *